United States Patent
Santo et al.

(10) Patent No.: US 11,784,962 B2
(45) Date of Patent: Oct. 10, 2023

(54) SYSTEMS AND METHODS FOR COLLABORATIVE CHAT WITH NON-NATIVE CHAT PLATFORMS

(71) Applicant: ServiceNow, Inc., Santa Clara, CA (US)

(72) Inventors: Samantha Santo, San Diego, CA (US); Alisson Douglas Da Silveira Pacheco, San Diego, CA (US); Stephen Witmer, San Diego, CA (US); Scott Michael Rhodes, Remote, CA (US); Evan Ross Lipton, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/385,382

(22) Filed: Jul. 26, 2021

(65) Prior Publication Data
US 2022/0070133 A1    Mar. 3, 2022

Related U.S. Application Data

(60) Provisional application No. 63/073,297, filed on Sep. 1, 2020.

(51) Int. Cl.
*H04L 51/56* (2022.01)
*G06F 3/0482* (2013.01)
(Continued)

(52) U.S. Cl.
CPC ............ *H04L 51/56* (2022.05); *G06F 3/0482* (2013.01); *G06F 3/04817* (2013.01);
(Continued)

(58) Field of Classification Search
CPC ....... H04L 51/36; H04L 51/043; H04L 51/16; H04L 51/26; H04L 67/306; H04L 67/12; H04L 51/52; G06F 3/04817; G06F 3/0482; G06F 3/04883; G06F 3/017; G06F 3/0481; G06F 3/04842; H04N 21/482
See application file for complete search history.

(56) References Cited

U.S. PATENT DOCUMENTS 6,609,122 B1    8/2003    Ensor
6,816,898 B1    11/2004   Scarpelli
(Continued)

*Primary Examiner* — Ninos Donabed
(74) *Attorney, Agent, or Firm* — FLETCHER YODER PC

(57) ABSTRACT

In accordance with the present approach, a collaborative chat system is provided that enables collaborative communication between a user preferring a native chat platform and a different user who communicates using a non-native or third-party chat platform. The user may particularly select various other users to be added to a collaborative chat, regardless of which chat platform the other users have set as their main or preferred communication channel. Indeed, when displaying the various users available to be added to the collaborative chat, the collaborative chat system may display a visual indication or icon that indicates which chat platform the various users are available through. The collaborative chat system or platform may utilize bi-directional communications between the native chat platform and any communicatively coupled third-party chat platforms to link the user with the selected other users within a collaborative chat instance.

17 Claims, 21 Drawing Sheets

(51) Int. Cl.
*H04L 51/043* (2022.01)
*H04L 67/306* (2022.01)
*G06F 3/04817* (2022.01)
*H04L 51/216* (2022.01)
*H04L 51/226* (2022.01)

(52) U.S. Cl.
CPC .......... *H04L 51/043* (2013.01); *H04L 51/216* (2022.05); *H04L 51/226* (2022.05); *H04L 67/306* (2013.01)

(56) References Cited

U.S. PATENT DOCUMENTS

| | | |
|---|---|---|
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,383,310 B1* | 6/2008 | Lyle .................... G06Q 10/107 709/204 |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,945,860 B2 | 5/2011 | Vambenepe |
| 7,966,398 B2 | 6/2011 | Wiles |
| 7,987,275 B2* | 7/2011 | Shae .................... H04L 12/1818 709/227 |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Non |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,413,556 B2* | 8/2016 | North Wood ......... H04L 51/043 |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2* | 11/2017 | Moon .................... H04L 67/125 |
| 10,951,554 B1* | 3/2021 | Highman ............ G06Q 30/0641 |
| 11,138,249 B1* | 10/2021 | Tosik ...................... G06N 5/02 |
| 2004/0017396 A1* | 1/2004 | Werndorfer ............. H04L 51/04 715/751 |
| 2004/0024822 A1* | 2/2004 | Werndorfer ............. G06F 3/167 709/206 |
| 2008/0005240 A1* | 1/2008 | Knighton ............... G06Q 30/02 709/204 |
| 2009/0093242 A1* | 4/2009 | Bhalekar .............. H04M 1/72436 455/418 |
| 2010/0218105 A1* | 8/2010 | Perov .................... G06F 16/954 715/738 |
| 2010/0293473 A1* | 11/2010 | Borst .................. H04L 12/1827 715/741 |
| 2011/0302098 A1* | 12/2011 | Yoshida .............. G06F 16/9535 709/205 |
| 2012/0214564 A1* | 8/2012 | Barclay ................ G07F 17/3272 463/17 |
| 2012/0306908 A1* | 12/2012 | Wood .................... H04L 51/043 345/619 |
| 2013/0246901 A1* | 9/2013 | Massand ................ G06F 40/197 715/229 |
| 2014/0040404 A1* | 2/2014 | Pujare .................. H04L 12/1818 709/206 |
| 2014/0181697 A1* | 6/2014 | Kirigin ............... H04L 12/1831 715/758 |
| 2014/0289034 A1* | 9/2014 | Wu ...................... G06Q 30/0231 705/14.31 |
| 2014/0324998 A1* | 10/2014 | Zhang ..................... H04L 51/04 709/206 |
| 2015/0026255 A1* | 1/2015 | Wexler .................. H04L 67/535 709/204 |
| 2015/0032492 A1* | 1/2015 | Ting ................ G06Q 10/063112 705/7.14 |
| 2015/0032751 A1* | 1/2015 | Ting .................... G06F 16/285 707/738 |
| 2015/0120828 A1* | 4/2015 | Allen ..................... H04L 51/222 709/204 |
| 2015/0143248 A1* | 5/2015 | Beechuk ................. H04L 67/10 715/739 |
| 2015/0254675 A1* | 9/2015 | Kannan .................. G06Q 30/02 705/304 |
| 2016/0044083 A1* | 2/2016 | Galloway ............... H04L 67/02 709/217 |
| 2016/0149839 A1* | 5/2016 | Yi ........................... H04L 51/04 709/206 |
| 2016/0246885 A1* | 8/2016 | Aravamudhan ..... G06F 16/9535 |
| 2016/0283947 A1* | 9/2016 | Yip ....................... G06Q 50/01 |
| 2016/0295018 A1* | 10/2016 | Loftus ................. H04M 3/5175 |
| 2016/0342911 A1* | 11/2016 | Kannan ............... G06Q 10/0631 |
| 2016/0380933 A1* | 12/2016 | Topaltzas ............... H04L 51/214 709/206 |
| 2017/0004182 A1* | 1/2017 | Simpson .................. H04L 51/52 |
| 2017/0005967 A1* | 1/2017 | Simpson .............. G06Q 10/101 |
| 2017/0006032 A1* | 1/2017 | Simpson ................. H04L 67/10 |
| 2017/0103425 A1* | 4/2017 | Christofi .............. G06Q 30/0255 |
| 2017/0324867 A1* | 11/2017 | Tamblyn ............... H04M 3/5191 |
| 2017/0324868 A1* | 11/2017 | Tamblyn ............... H04L 51/046 |
| 2020/0241949 A1* | 7/2020 | Basu .................... G06F 11/0775 |
| 2021/0149933 A1* | 5/2021 | Chang .................... G06F 16/35 |

\* cited by examiner

FIG. 10

SYSTEMS AND METHODS FOR COLLABORATIVE CHAT WITH NON-NATIVE CHAT PLATFORMS

CROSS-REFERENCE TO RELATED APPLICATION

This application claims priority from and the benefit of U.S. Provisional Application Ser. No. 63/073,297, entitled "SYSTEMS AND METHODS FOR COLLABORATIVE CHAT WITH NON-NATIVE CHAT PLATFORMS," filed Sep. 1, 2020, which is incorporated by reference herein in its entirety for all purposes.

BACKGROUND

The present disclosure relates generally to providing collaborative chat features.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of performing these core functions, certain enterprise and other organization users may utilize chat or messaging platforms, which enable users to exchange written messages in a chat or conversation format. In a large organization, however, it may be common for different users in the organization, or different business groups or units within the organization, to use different chat or messaging platforms or to have a specified preference for one chat platform over another. In such circumstances, the use of or preference for different chat platforms may impede, rather than improve, communication within the organization.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates generally to a collaborative chat system for communicatively connecting a user of a native chat platform with a different user within an organization who communicates using a non-native chat platform (e.g., a third-party chat platform). For example, the native chat platform may be built into or provided with a cloud platform as one or more communication features natively available to users of the cloud platform. In the example of a service agent (e.g., customer service representative, technical support technician) of a service provider, the native chat platform may include an agent-based user interface (e.g., module or dashboard) that an agent utilizes to discuss a topic (e.g., application issue, network issue, licensing issue, customer account, billing issue) with a customer of the service provider.

It should be appreciated that in order to provide useful, real-world examples, herein the present disclosure may employ specific examples related to providing technical support to customers. However, it should be understood that the present techniques may be extended to any suitable end-use, such as one involving accounting support, human resource support, and so forth. With this in mind, in the context of a technical support example, when providing support to the customer an agent may want to concurrently communicate via a chat format with other users associated with the service provider, where the other users may be able to help resolve an issue or concern raised by the customer. For example, the agent may request approval for an action from a supervisor, request technical input from an engineer or subject matter expert, and so forth. However, certain users within the organization may not have access to the chat platform used by the agent or may have a specified preference for another chat platform. In such circumstance, these users may be difficult to contact via the chat platform employed by the agent, thus affecting the ability of the agent to resolve customer concerns.

Accordingly, the collaborative chat system discussed herein may receive user input indicating that a collaborative chat regarding a particular topic is requested by the agent. The agent may particularly select various users to be added to the collaborative chat, regardless of which chat platform the users have set as their main or preferred communication channel. Indeed, when displaying the various users available to be added to the collaborative chat, the collaborative chat system may display a visual indication (e.g., icon or symbol) that indicates through which chat platform the various users are available. The collaborative chat system or platform may utilize bi-directional communications between the native chat platform and any communicatively coupled third-party chat platforms to link the agent with the selected users within a collaborative chat instance. In an embodiment, the collaborative chat system may post (e.g., automatically post) or automatically provide a record summary (e.g., topic, ticket, matter) for which assistance is requested, and the added users may communally and collaboratively provide information or actions that facilitate incident resolution and/or development of the topic. Throughout discussion, the collaborative chat system may display the visual indication regarding which chat platform the users are implementing, such as next to the users' names, within a contact card associated with the users, and so forth.

The collaborative chat system may also include various features that facilitate efficient conversations among the users. In some cases, the collaborative chat system maintains and presents a list of navigable chats for a user, who may be involved in record-based chats, group chats, one-on-one chats, and so forth. Moreover, the user may hover a mouse pointer over a particular user to display a contact card associated with the particular user, who may be selected or favorited as a collaborator. When adding users to a chat, the collaborative chat system presents lists of users to be added that are sorted by user presence and based on favorited collaborators. Additionally, the collaborative chat system may accept quick actions or quick commands that users type or select from a menu, thereby enabling the users to add other users to the chat, mention other users in the chat, request knowledge base articles to be generated, and so forth, regardless of their preferred chat platform. As another example, the collaborative chat system may implement threading or hierarchical ordering of messages, such that sub-conversations may be maintained and organized within an overarching main conversation for efficient navigation by participants.

Moreover, the collaborative chat system may facilitate the sharing and generation of knowledge articles associated with the discussed topic to streamline future resolution of similar customer incidents or events. For example, messages may be identified as relevant to a particular solution, pinned or otherwise selected by users, and then leveraged within an automatic knowledge article generation system that includes the selected messages (or the relevant content of the selected messages) with the initial description of the discussed topic in an automatically generated knowledge article. The collaborative chat system therefore enables the enterprise to improve or optimize its topic resolution by communicatively coupling users across various chat platforms within a single chat box, while also generating a store of resolution information usable to facilitate future resolution of similar topics.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a screenshot of an embodiment of a user interface of the collaborative chat system including a dashboard by which an agent may address a particular topic raised by a customer, in accordance with aspects of the present disclosure;

DETAILED DESCRIPTION

Figure 1:
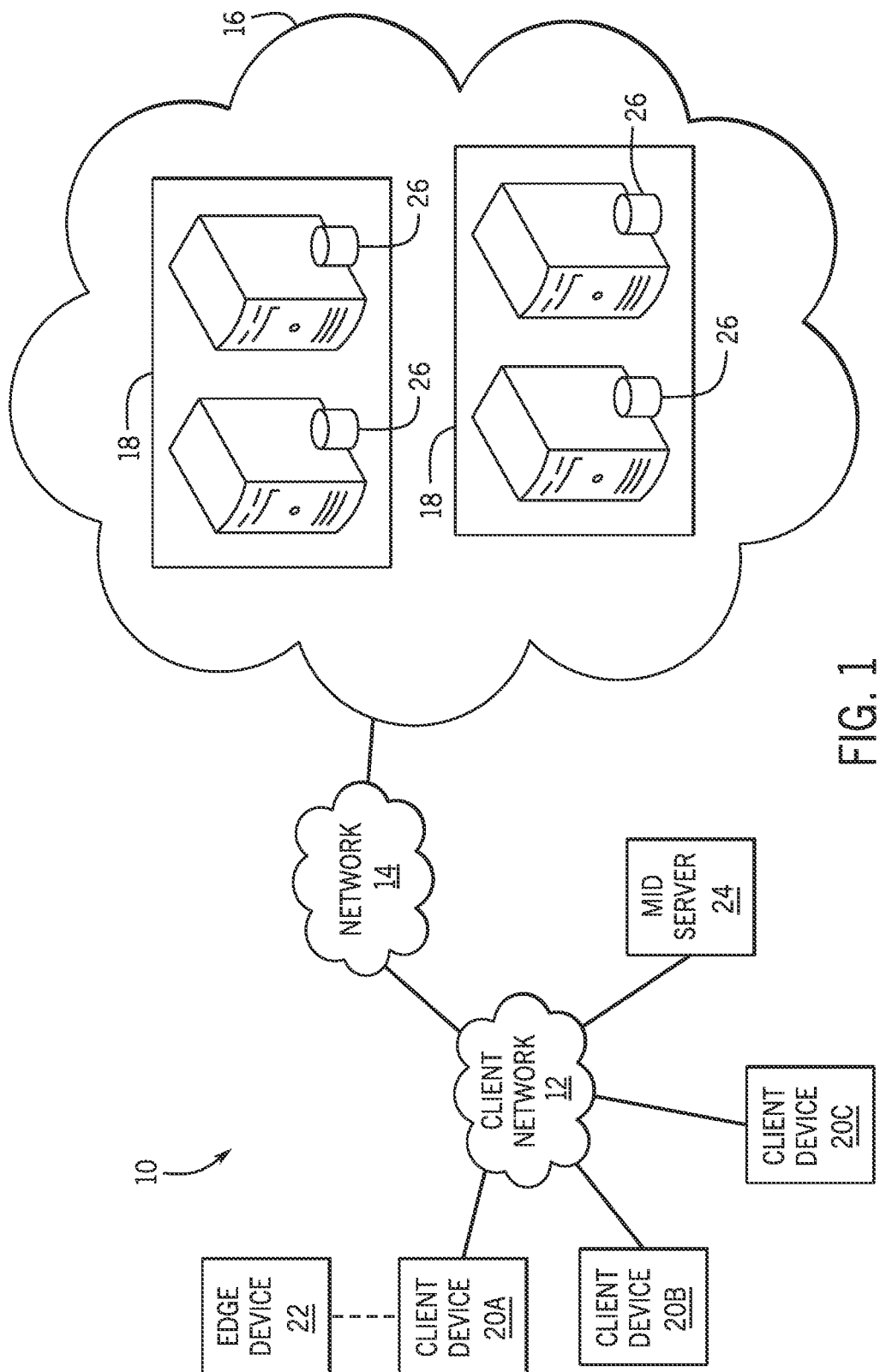
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Furthermore, as used herein, the term "native chat platform" refers to an application or software program that is native to (i.e., provided as a part or feature of) a cloud-based platform associated with a service provider. For example, the native chat platform may include or be accessed via a user interface included in a dashboard that enables an agent of the service provider to provide assistance or information to a customer. Additionally, as used herein, the terms "non-native chat platform" and "third-party chat platform" may be used interchangeably to refer to an application or software program that is distinct or independent from the native chat platform and, for example, may be provided by a separate or third-party as an add-on or installation to the cloud-based platform. The terms "non-native chat platform" and "third-party chat platform" as used herein may also encompass a chat or communication platform that is hosted or supported external to the cloud platform, but which can be accessed from the cloud platform via a network or Internet connection. Some examples of third-party or non-native chat platforms may include, but are not limited to, MICROSOFT TEAMS® of Microsoft Corporation, SLACK® of Slack Technologies, Inc., ZOOM™ of Zoom Video Communications, Inc., CISCO WEBEX MESSENGER™ of Cisco Systems, Inc., DISCORD® of Discord, Inc., HANGOUTS™ of Google, LLC, and so forth.

The present approach relates generally to a collaborative chat system for communicatively connecting a user of a native chat platform with a different user within an organization who communicates using a non-native chat platform (e.g., a third-party chat platform). That is, a user may want to concurrently communicate via a chat format with other users associated with the service provider who may be able to help resolve an issue or event. For example, the agent may request approval for an action from a supervisor, request technical input from an engineer or subject matter expert, and so forth. However, certain users within the organization may not have access to the chat platform used by the agent or may have a specified preference for a different chat platform. In such circumstance, these users may be difficult to contact via the chat platform employed by the agent.

Accordingly, the collaborative chat system discussed herein may receive user input indicating that a collaborative chat regarding a particular topic (e.g., record, record summary, case, incident) is requested by an agent or other user. The user may particularly select various other users to be added to the collaborative chat, regardless of which chat platform the other users have set as their main or preferred communication channel. Indeed, when displaying the various users available to be added to the collaborative chat, the collaborative chat system may display a visual indication (e.g., icon) that indicates which chat platform the various users are available through. The collaborative chat system or platform may utilize bi-directional communications between the native chat platform and any communicatively coupled third-party chat platforms to link the user with the selected other users within a collaborative chat instance.

In an embodiment, the user provides a record or summary of the topic for which assistance is requested, and the added users may communally and collaboratively provide information or actions that facilitate resolution or development of the topic. Throughout discussion, the collaborative chat system may display the visual indication regarding which chat platform the users are implementing, such as next to the users' names, within a contact card associated with the users, and so forth. Moreover, the collaborative chat system may facilitate the sharing and generation of knowledge articles associated with the discussed topic to streamline future resolution of similar customer incidents or events. For example, messages may be identified as relevant to a particular solution, pinned or otherwise selected by users, and then leveraged within an automatic knowledge article generation system that includes the selected messages (or the relevant content of the selected messages) with the initial description of the discussed topic in an automatically generated knowledge article. The collaborative chat system therefore enables the enterprise to improve or optimize its topic resolution by communicatively coupling users across various chat platforms within a single chat box, while also generating a store of resolution information usable to facilitate future resolution of similar topics.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
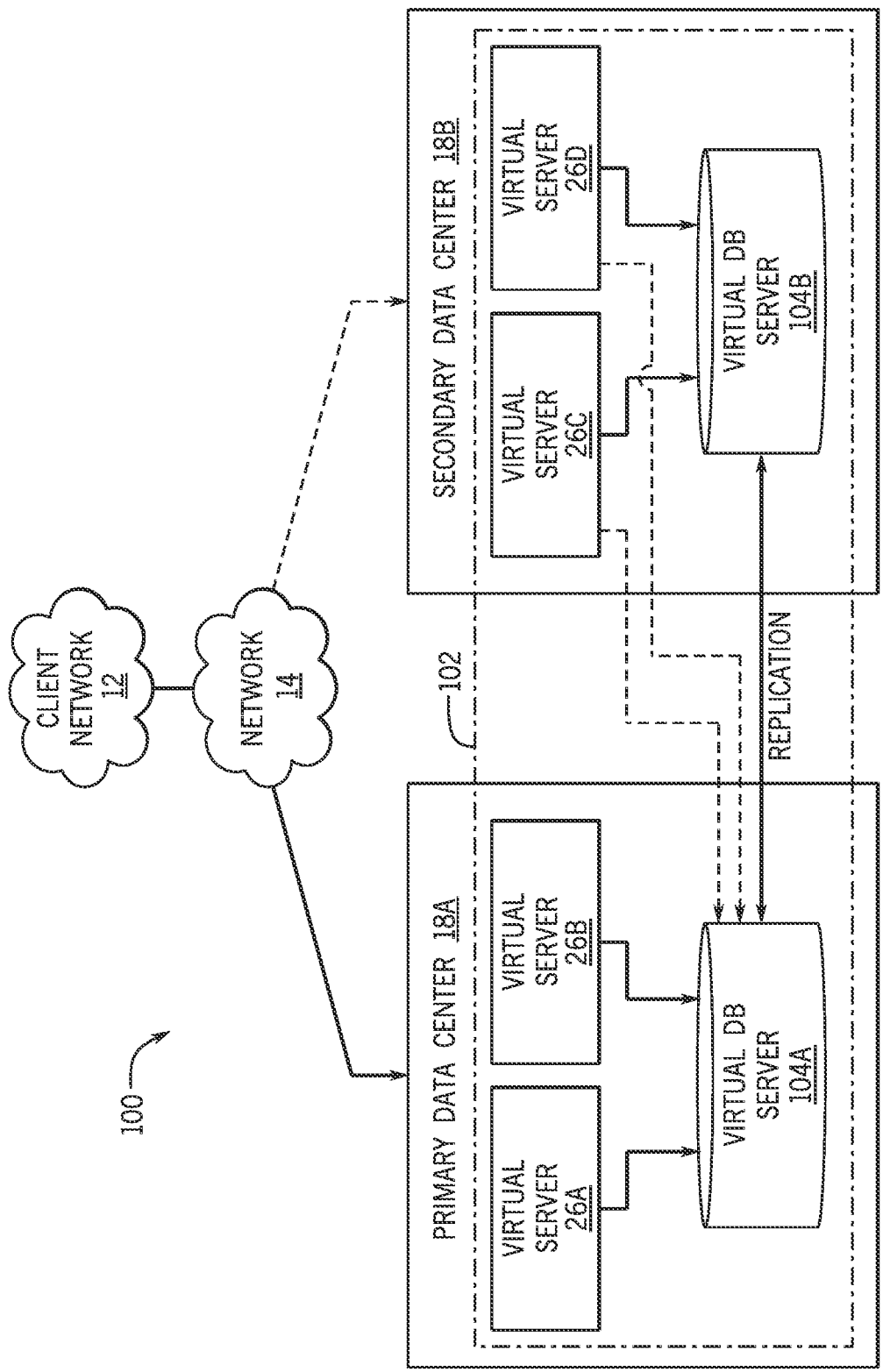
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
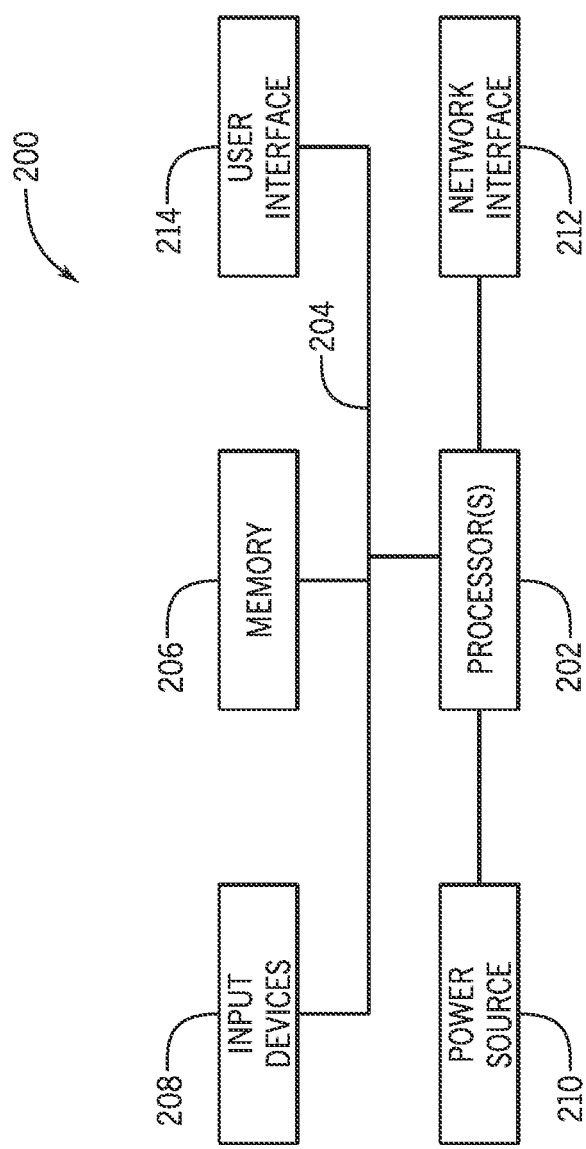
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
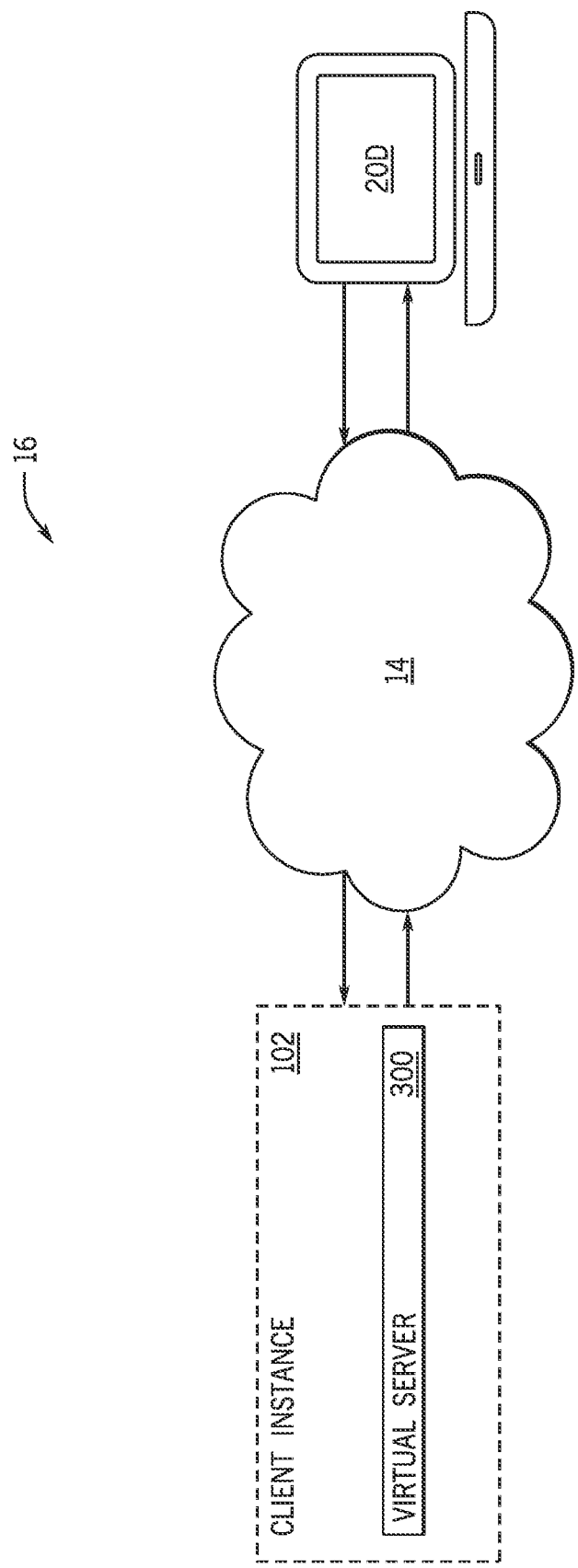
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As mentioned above, present embodiments are directed to a collaborative chat system, which may be supported and enhanced by deployment on a cloud-based infrastructure as described herein, such as in a multi-instance or multi-tenant architecture as described above. Thus, the collaborative chat system may be implemented on the cloud-based platform 16 and accessed by the agent through the client instance 102 to initiate and manage chats between native chat platform users and third-party chat platform users, as discussed in more detail below. However, it is to be understood that the collaborative chat system may alternatively be implemented locally on the client devices 20 or on any other suitable computing devices for conducting collaborative chats. Indeed, with respect to the techniques discussed herein, these techniques may be implemented in a multi-instance architecture as described herein, a multi-tenant architecture, a client-server or public network (i.e., Internet) context, or, in some instances, on a single computer or server suitably configured.

With the preceding context of the cloud-based platform 16 in mind, discussion is now provided herein regarding a collaborative chat system 310. For illustration, the collaborative chat system 310 will be described with reference to initiating a collaborative chat (e.g., collaborative chat session, collaborative chat box, collaborative chat interface) between users of a native chat platform and users of any suitable number of third-party chat platforms. Then, the collaborative chat system 310 will be discussed with respect to its integration within an agent dashboard, followed by further discussion of conducting conversations within the collaborative chat.

As will be understood, connecting users across various platforms may facilitate efficient discussion and/or resolution of topics. As one example, when assisting a customer, an agent may determine that a solution to an issue is not readily identifiable and may seek collaboration or escalation from other individuals in the organization via a collaborative or group chat. However, subject matter experts, engineers, supervisors, and other various users of the enterprise may not have access to the chat platform used by the agent and/or may prefer a different chat platform. As such, the agent may leverage the collaborative chat system 310 disclosed herein to communicatively couple various users across multiple chat platforms and thereby improve topic or incident resolution quality and/or response time. However, although discussed as an agent initiating the collaborative chat, it should also be understood that any suitable users, including users associated with the third-party chat platforms, may initiate the collaborative chats discussed herein.

Figure 5:
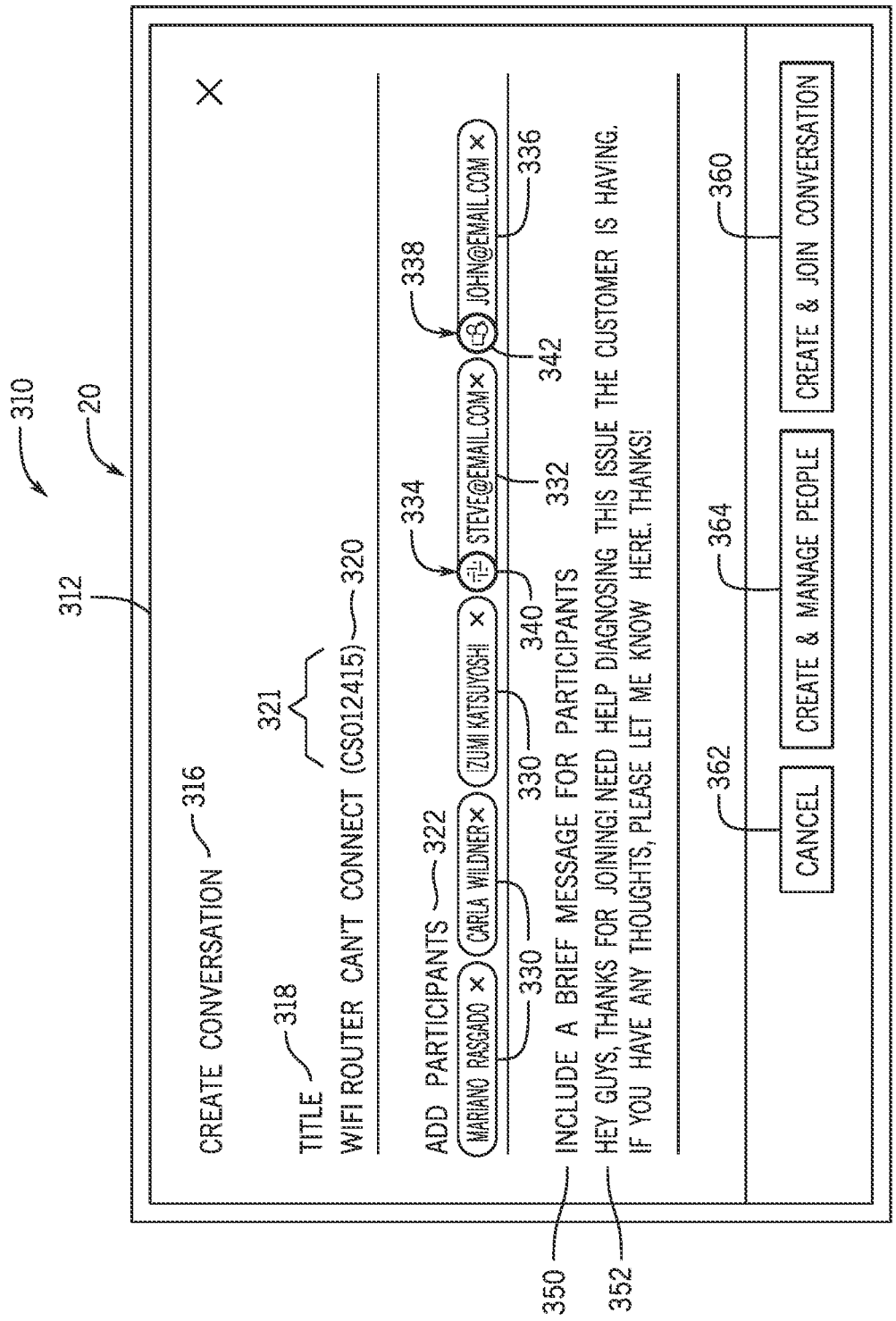
FIG. 5 is a screenshot of an embodiment of a user interface of a collaborative chat system for starting a collaborative chat between a user of a native chat platform and one or more users of one or more third-party chat platforms, in accordance with aspects of the present disclosure.

As a first example, FIG. 5 is a screenshot of an embodiment of a user interface 312 (e.g., a graphical user interface) by which a user (hereinafter, "agent") may initiate a collaborative chat session with other users, including users of one or more third-party (i.e., non-native) chat platforms, in accordance with aspects of the present disclosure. In some embodiments, the user interface 312 is a screen provided within a native chat platform that is displayed on a suitable client device 20. As previously introduced, the native chat platform may be a software program that is native, local, or in-house relative to a computing system of a service provider. For example, the native chat platform may be one of multiple tools, widgets, or modules included within a computing or task resolution workspace, such as Agent Workspace™ of ServiceNow, Inc., which the agent may utilize to solve or discuss any number of suitable internal topics. However, it should be understood that the native chat platform may also be implemented to discuss any suitable topic, including external topics.

In an embodiment, the user interface 312 may be presented in response to a user (e.g., agent) providing input requesting that a conversation be created. As such, the user interface 312 includes a create conversation header 316, as well as a title header 318 below which the agent may indicate a topic 320 around which a collaborative chat is requested. The topic 320 of the illustrated example also includes a record number 321 that may be associated with a particular record or ticket open within the agent dashboard. Indeed, in an embodiment, the topic 320 is automatically populated based on a selected ticket or issue which the agent is currently addressing via their associated dashboard, discussed below.

Moreover, the user interface 312 includes an add participant header 322 where the agent may select particular users to receive invitations, or be automatically added, to the collaborative chat. In the illustrated example, three users 330 of the native chat platform, a user 332 of a first non-native (i.e., third-party) chat platform 334, and a user 336 of a second non-native chat platform 338 have been selected as potential participants to be added to the collaborative chat regarding the topic 320. Notably, the user interface 312 includes a first icon 340 indicating the identity of the first non-native chat platform 334 adjacent to a user profile icon (e.g., image, initials, contact information, name, email address, phone number) of the user 332 of the first non-native chat platform 334 and a second icon 342 indicating the identity of the second non-native chat platform 338 used by the user 336. Accordingly, the agent is readily able to identify which chat platform selected users (e.g., chat participants) have set as their preferred communication channel. Indeed, the collaborative chat system 310 may be communicatively coupled with the non-native (i.e., third-party) chat platforms 334, 338 (e.g., via bi-directional communication links) to enable the agent to initiate collaborative chats between any suitable numbers of users associated with the native chat platform and/or any communicatively coupled non-native chat platforms 334, 338.

In the illustrated embodiment, the first non-native chat platform 334 is SLACK®, the first icon 340 is an associated indicator of SLACK®, the second non-native chat platform 338 is MICROSOFT TEAMS®, and the second icon 342 is an associated indicator of MICROSOFT TEAMS®. It is presently recognized that any suitable number or types of non-native chat platforms may be integrated with the native chat platform, including MICROSOFT TEAMS®, SLACK®, ZOOM™□, CISCO WEBEX MESSENGER™, DISCORD®, HANGOUTS™, and so forth, and that these non-native chat platforms may be indicated with appropriate icons within the user interface 310. Indeed, although generally discussed with reference to the first non-native chat platform 334 and the second non-native chat platform, the present techniques may be efficiently extended to enable communications between the native chat platform and three, four, five, six, seven, eight, or more non-native (i.e., third-party) chat platforms. Further, the user interface 312 may generally indicate that users 330 are utilizing the native chat platform by omitting platform-indicating icons. However, it should be understood that, in other embodiments, an icon associated with the native chat platform may also be presented in conjunction with the contact information or name of the users 330 of the native chat platform.

The user interface 312 of the illustrated embodiment of the collaborative chat system 310 also includes a description header 350 below which the agent may provide introductory information 352 regarding the topic of discussion. Accordingly, with the appropriate topic 320, users 330, 332, 336, and/or introductory information 352 provided, the agent may select a "create and join conversation" button 360 to initiate the collaborative chat. Alternatively, the agent may select a cancel button 362 to terminate construction of the collaborative chat or select a "create and manage people" button 364 to generate the collaborative chat and proceed with further refinement of the users or participants to be added or removed.

Figure 6:
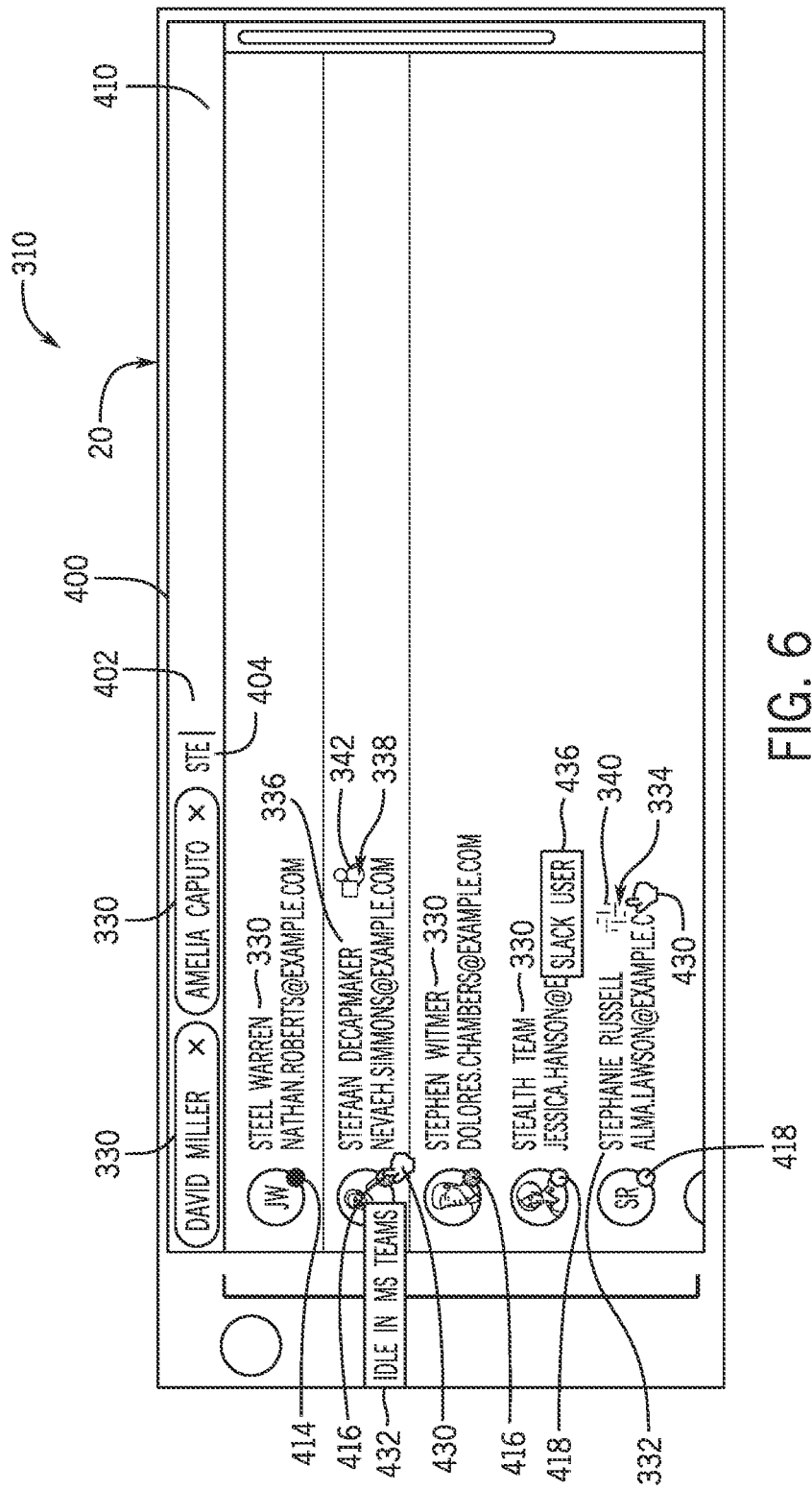
FIG. 6 is a screenshot of an embodiment of a user interface of the collaborative chat system for selecting the users to be added to the collaborative chat, in accordance with aspects of the present disclosure.

FIG. 6 is a screenshot of an embodiment of a user interface 400 of the collaborative chat system 310 for selecting the users to be added to the collaborative chat, in accordance with aspects of the present disclosure. In an embodiment, the user interface 400 corresponds to a streamlined chat participant selector that is presented on the client device 20 in response to the agent clicking beneath the add participant header 322 of the user interface 312 of FIG. 5. Within the user interface 400, the agent may provide input indicative of participants to be added to the collaborative chat within a user field 402. For example, in the illustrated embodiment, two users 330 of the native chat platform are selected and displayed within the user field 402. Further, input 404 is provided that the collaborative chat system 310 implements to narrow a user listing 410 to users corresponding to the input 404. Notably, the user listing 410 may present corresponding users in an order that prioritizes users having an active status indicator 414 before users having an idle status indicator 416 and prioritizes users having an idle status indicator 416 before users having an offline status indicator 418. This process therefore enables the agent to rapidly select users that are more likely to be online and available to provide immediate assistance regarding the topic 320.

In the illustrated example, a user 330 of the native chat platform is displayed first in the user listing 410 based on the active status indicator 414 associated with the user 330. Beneath the user 330 of the native chat platform, a user 336 of a second non-native chat platform (e.g., indicated by the second icon 342) and another user 330 of the native chat platform are displayed. Indeed, because these users each are associated with an idle status indicator 416, they are presented in the user listing 410 between any users having an active status indicator 414 and an offline status indicator 418, despite the user 336 being associated with the second non-native chat platform 338 (e.g., MICROSOFT TEAMS®). Continuing through the user listing 410, a further user 330 of the native chat platform and a user 332 of the first non-native chat platform (e.g., indicated by the first icon 340 associated with SLACK® in the present embodiment) are displayed beneath users having the idle status indicator 416, based on their corresponding offline status indicators 418.

Further, the user interface 400 of the collaborative chat system 310 enables the agent to hover a mouse indicator 430 over any of the icons or indicators disclosed herein to cause the display of (such as via a pop-up balloon or window) additional information regarding the users preferred chat platform and current status within the respective preferred chat platform. As a first example, hovering the mouse indicator 430 over the idle status indicator 416 of the user 336 of the second non-native chat platform provides a first text box 432 indicating that the user 336 is idle within the second non-native chat platform 338. Similarly, hovering the mouse indicator 430 over the first icon 340 of the user 332 of the first non-native chat platform displays a second text box 436 indicating that the user 332 has selected the first non-native chat platform 334 (e.g., SLACK®) as their preferred communication channel.

Figure 7:
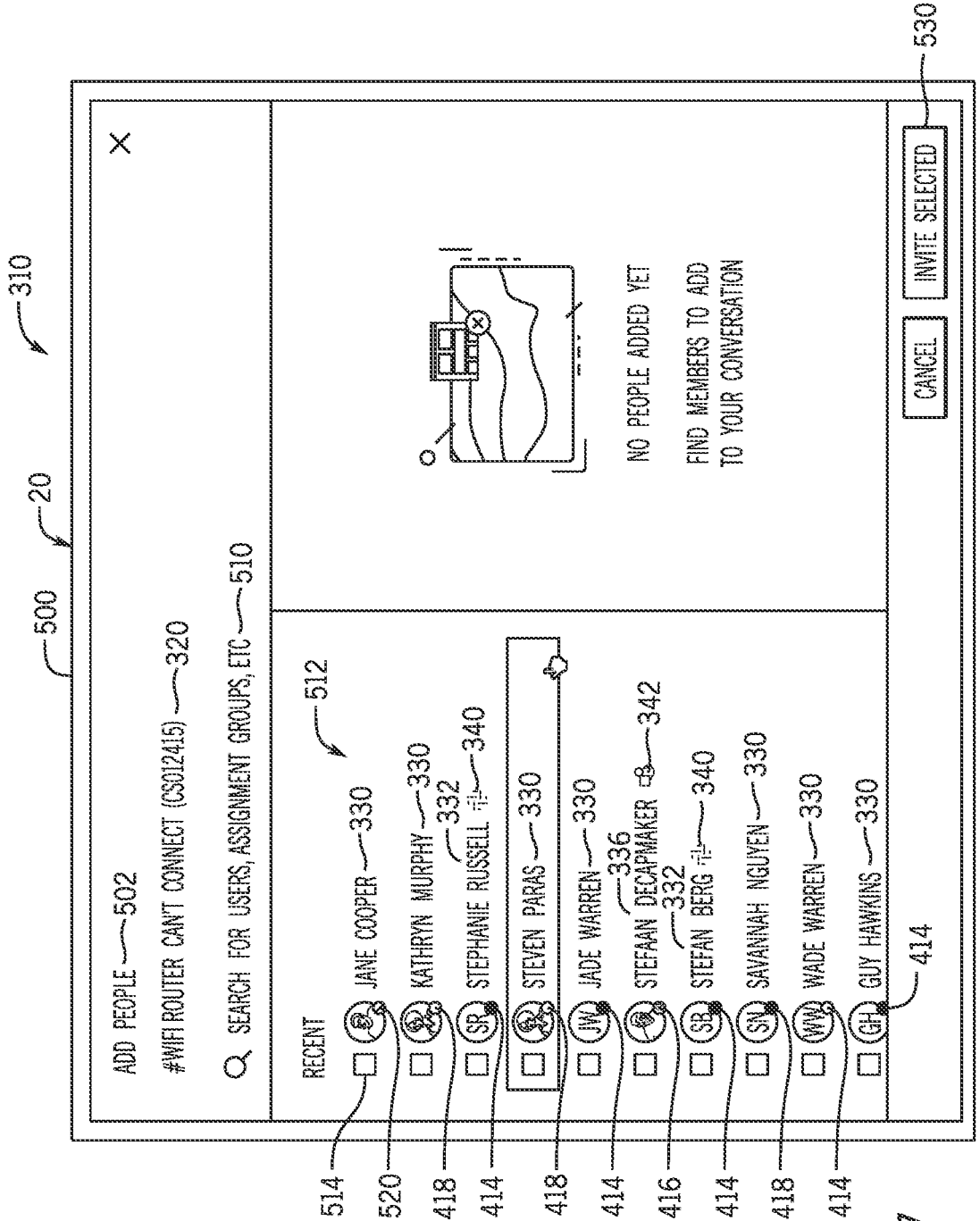
FIG. 7 is a screenshot of an embodiment of a user interface of the collaborative chat system for selecting the users to be initially added to the collaborative chat, in accordance with aspects of the present disclosure.

With additional reference to selecting users to participate in a collaborative chat between multiple chat platforms, FIGS. 7-9, discussed below, provide illustrative examples of user interfaces that the collaborative chat system 310 may provide to enable the agent to operate an advanced user selection module. FIG. 7 is a screenshot of an embodiment of a user interface 500 of the collaborative chat system that is displayed on the client device 20 for selecting the participants to be initially added to the collaborative chat, in accordance with aspects of the present disclosure. The user interface 500 includes an add people header 502, which is positioned above the topic 320 that is to be discussed in the collaborative chat. Accordingly, by providing input into a search bar 510, the agent may filter and refine a checkable user listing 512. That is, within the checkable user listing 512, the agent may rapidly identify and select (e.g., via checkboxes 514) any suitable users to be unified within a single chat box, despite certain of the users being associated with the non-native (i.e., third-party) chat platforms 334, 338.

As mentioned above, the status indicators 414, 416, 418 may be conveniently displayed adjacent to the name of the users 330, 332, 336 to facilitate efficient visual identification of users that may be readily available to assist the agent. Moreover, certain users may be associated with a busy status indicator 520 that indicates the user is currently engaged in other obligations. After selecting certain users, the agent may therefore select an invite selected button 530 to transmit an invitation to join a collaborative chat to the selected users. However, as mentioned above, certain embodiments may automatically add the selected users to the collaborative chat, without awaiting confirmation from the selected users, based on particular user settings or authorizations.

Figure 8:
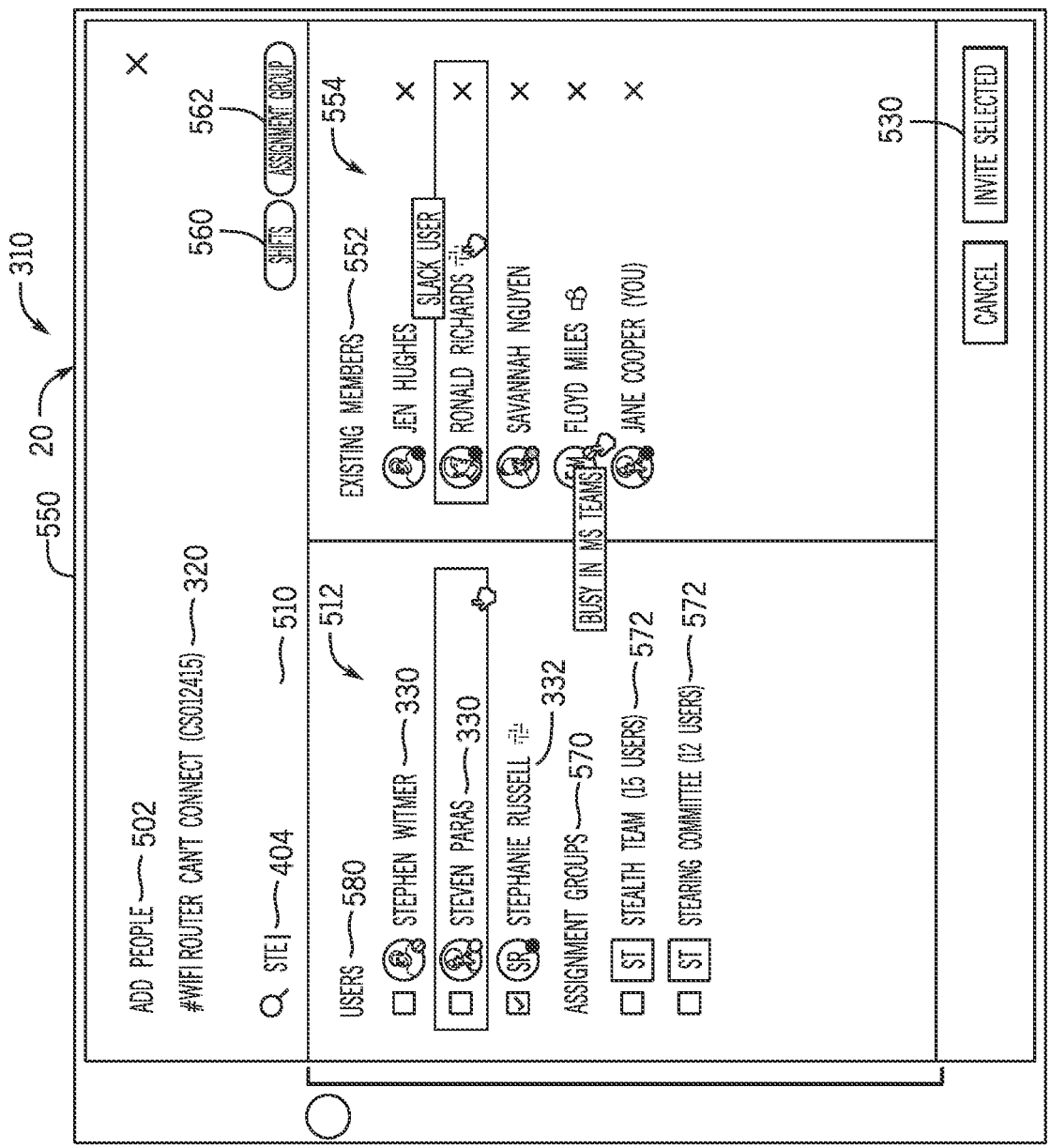
FIG. 8 is a screenshot of an embodiment of a user interface of the collaborative chat system for selecting additional users to be subsequently added to existing members of the collaborative chat, in accordance with aspects of the present disclosure.

FIG. 8 is a screenshot of an embodiment of a user interface 550 of the collaborative chat system 310 for selecting additional participants to be subsequently added to the collaborative chat, in accordance with aspects of the present disclosure. Indeed, the user interface 550 may be displayed on the client device 20 in response to the agent selecting an initial group of existing members 552, which are displayed in an existing member window 554 of the user interface 550. Further, the agent may provide the input 404 to the search bar 510 to identify additional participants to be added to the collaborative chat. As presently recognized, the search bar 510 may include a shifts filter button 560 and/or an assignment group filter button 562 that enable further, selective refinement of the users displayed in the checkable user listing 512.

For example, after selecting the assignment group filter button 562, the checkable user listing 512 may include an assignment groups heading 570 that displays various assignment groups 572. Selection of an assignment group may transmit chat invitation requests to each user associated with the selected assignment group 572, in an embodiment. Similarly, selection of the shifts filter button 560 may present a listing of groups of users assigned to various shifts (e.g., morning shift, afternoon shift), such that the agent may tailor user selection based on the particular time of day and users working during the particular time of day. In the illustrated embodiment, the user interface 550 also includes a user header 580 that also displays the various users 330, 332, 336 available for addition, as discussed above.

Figure 9:
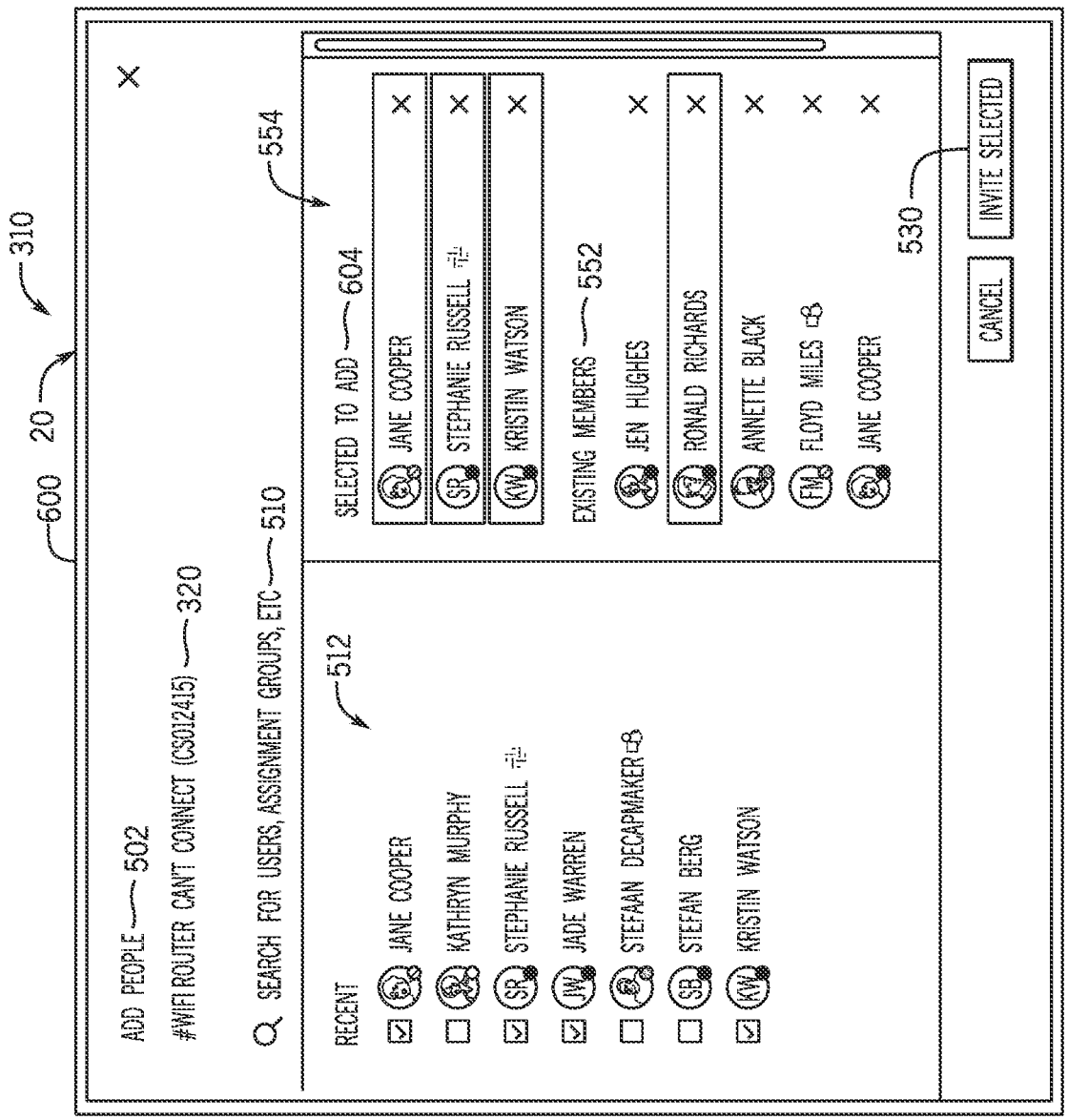
FIG. 9 is a screenshot of an embodiment of a user interface of the collaborative chat system for selecting the additional users to be subsequently added to the existing members of the collaborative chat, in accordance with aspects of the present disclosure.

FIG. 9 is a screenshot of an embodiment of a user interface 600 of the collaborative chat system 310 for selecting the additional participants to be subsequently added to the collaborative chat, in accordance with aspects of the present disclosure. Indeed, after the existing members 552 are joined within a single communication channel, the agent may implement the user interface 600 to select further users, which are displayed beneath a selected to add header 604 of the existing member window 554. Thus, further selection of the invite selected button 530 transmits an additional chat invitation request to the additionally selected users.

Figure 10:
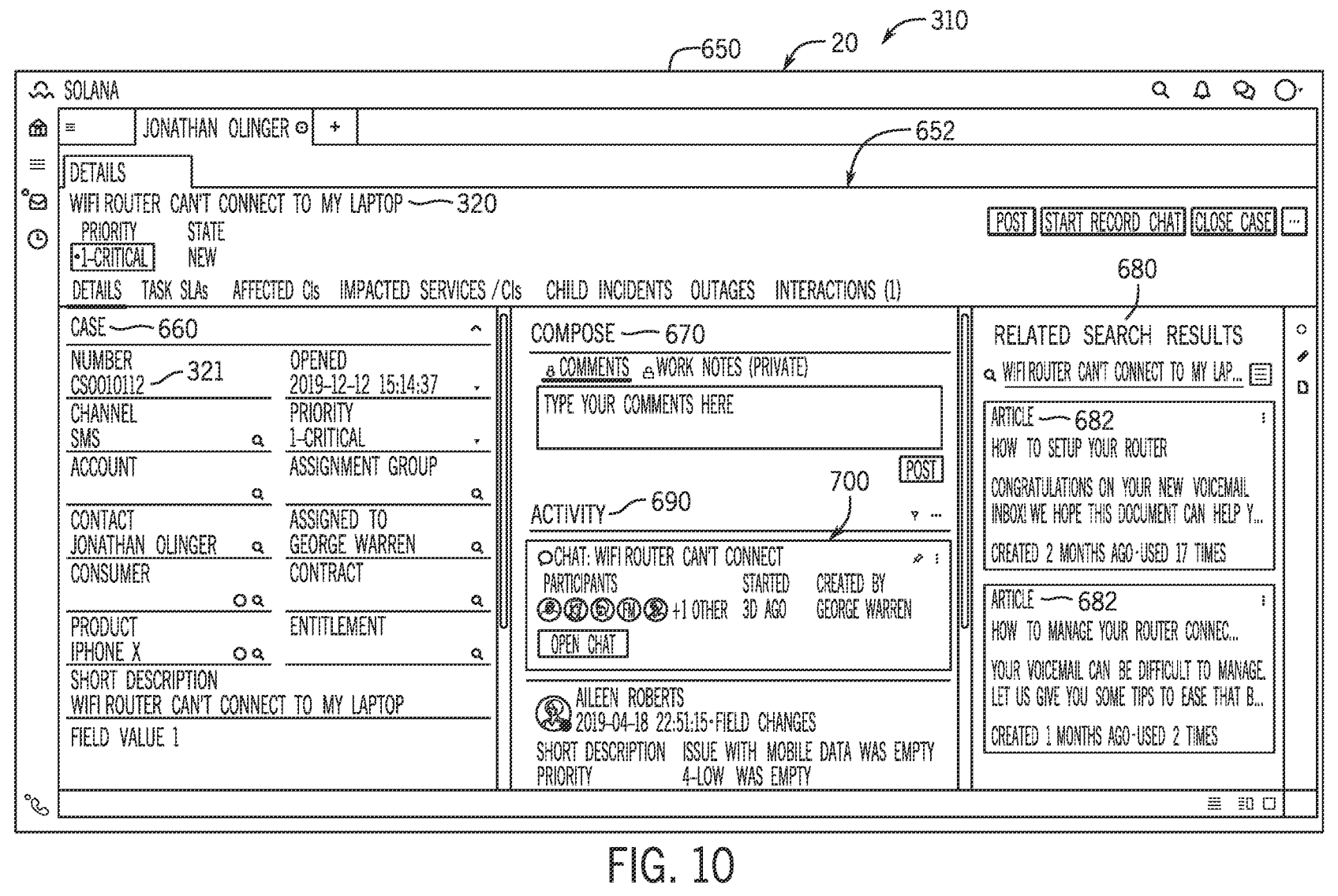

FIG. 10 is a screenshot of an embodiment of a user interface 650 of the collaborative chat system 310 including a dashboard (e.g., contextual side bar) 652 by which an agent may address the topic 320, such as a ticket or issue raised by a customer, in accordance with aspects of the present disclosure. The dashboard 652 may include various modules, menu items, expandable and/or collapsible components, and/or widgets that facilitate discussion, record-keeping, development, and/or resolution of the topic 320. For example, in the illustrated embodiment, the dashboard 652 includes a case module 660 including details regarding the topic 320, such as the record number 321 associated with or assigned to the topic 320. Further, a compose module 670 enables agents or other users that may access the dashboard or topic 320 to provide information regarding the progression or completion of the topic. In certain embodiments, the dashboard 652 also includes a related search results module 680 that presents articles (e.g., knowledge articles 682) associated with the topic 320.

However, as presently recognized, certain topics 320 may benefit from active discussion between personnel of various job types, roles, qualifications, and backgrounds, particularly in situations in which the knowledge articles 682 do not include resolution information sufficient for addressing the present topic 320. Accordingly, the collaborative chat system 310 may be embedded within the dashboard 652 within an activity module 690 having a collaborative chat 700, which is discussed in more detail below.

Figure 11:
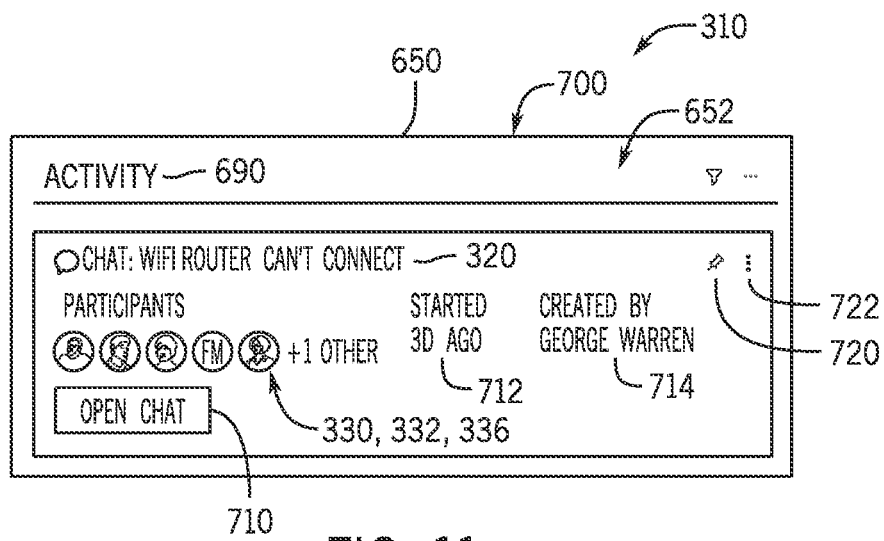
FIG. 11 is a screenshot of an embodiment of the user interface of FIG. 10, further illustrating features of the collaborative chat included within the dashboard, in accordance with aspects of the present disclosure.

FIG. 11 is an enlarged portion of the embodiment of the user interface 650 of FIG. 10, further illustrating features of the collaborative chat 700 included within the dashboard 652, in accordance with aspects of the present disclosure. The collaborative chat 700 is beneficially embedded within or accessible within the dashboard 652 to enable the agent to efficiently seek peer input on addressing the topic 320, which may be raised by a customer. Indeed, as previously discussed, the various users 330, 332, 336 of native and non-native chat platforms may be united within a common chat box that is accessible upon selection of an open chat button 710. The representation of the collaborative chat 700 in the dashboard 652 may also include various information regarding the collaborative chat 700, such as a start date indication 712 and a creator indication 714. Further, the collaborative chat 700 may be pinned to a top portion of the activity module 690 based on selection of a pin button 720, thereby maintaining the collaborative chat 700 at a readily reachable position within the dashboard 652. By selecting a setting button 722, further information and settings regarding the collaborative chat 700 may also be displayed, such as options to update members, update file sharing settings, terminate the collaborative chat 700, and so forth.

Figure 12:
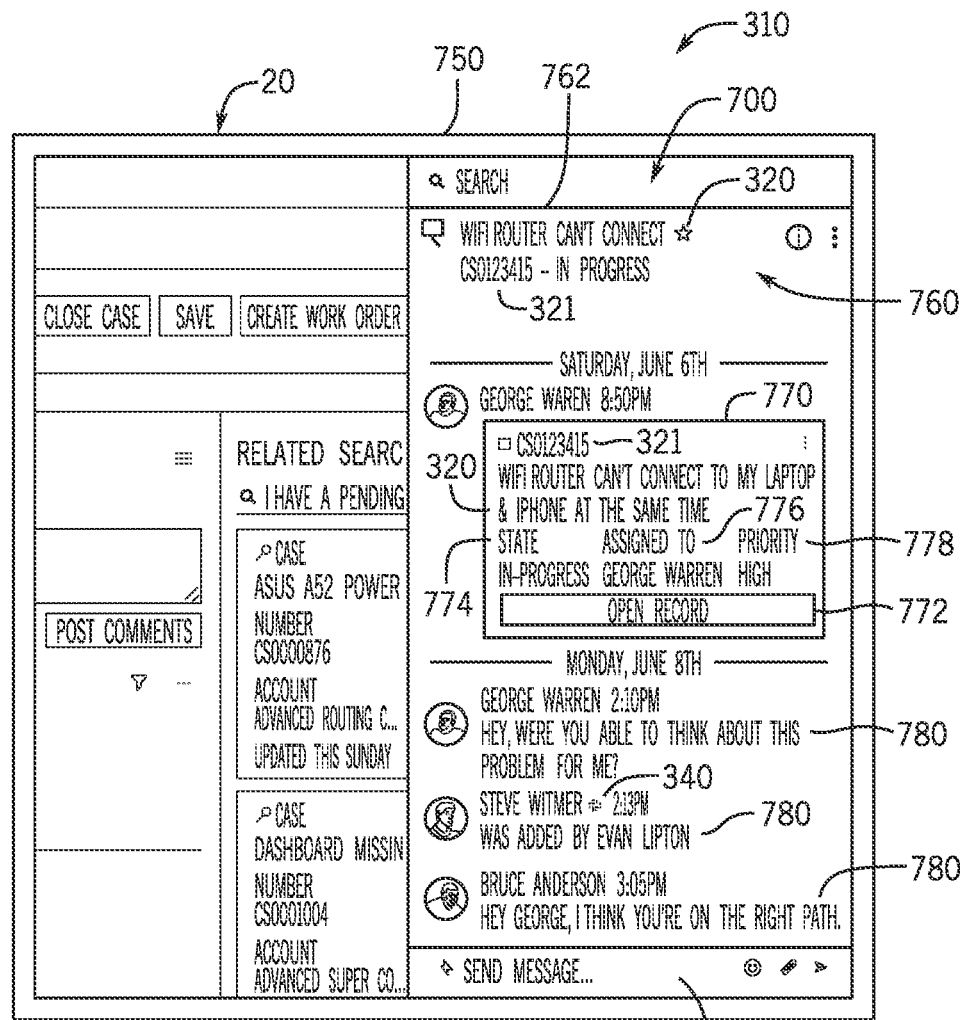
FIG. 12 is a screenshot of an embodiment of a user interface of the collaborative chat system, in which users from both native and third-party chat platforms may collectively discuss a topic within a collaborative chat displayed at an edge of the dashboard, in accordance with aspects of the present disclosure.

FIG. 12 is a screenshot of an embodiment of a user interface 750 of the collaborative chat system 310, in which chat participants from both native and non-native (i.e., third-party) chat platforms may collectively discuss the topic 320 within the collaborative chat 700, in accordance with aspects of the present disclosure. The user interface 750 may be displayed on the client device 20 at an edge of the dashboard 652 in response to the agent selecting the open chat button 710 of the user interface 650. Although illustrated at the edge portion of the dashboard 652, it should be understood that the collaborative chat 700 may presented on any suitable portion of the display screen of the client device 20, such as a bottom portion, a top portion, and so forth. Indeed, based on a modularity of the dashboard 652, the agent may position the collaborative chat 700 in a desired or target position that provides efficient communication with the involved chat members.

Looking to the contents of the collaborative chat 700, the topic 320 and associated record number 321 may be contained within a header portion 760 of a chat window 762. When initiating the collaborative chat 700, the collaborative chat system 310 may provide an interactive record item 770 associated with the topic 320 having the record number 321, which chat members may open via an open record button 772 to review complete and detailed information regarding the topic 320. However, for efficient understanding of high-level case details, the interactive record item 770 may also indicate a status 774, agent assignment 776, and priority 778 of the topic 320. Moreover, within the chat window 762, the chat participants may provide various chat entries 780 by providing user input (e.g., text, links, emojis, files, attachments) into a chat box 782. Because the participants may be based on any suitable chat platform, the collaborative chat 700 therefore enables the multi-platform communal discussion of the topic 320, while also displaying the icons 340, 342 indicating the chat platforms from which the participants are communicating.

Figure 13:
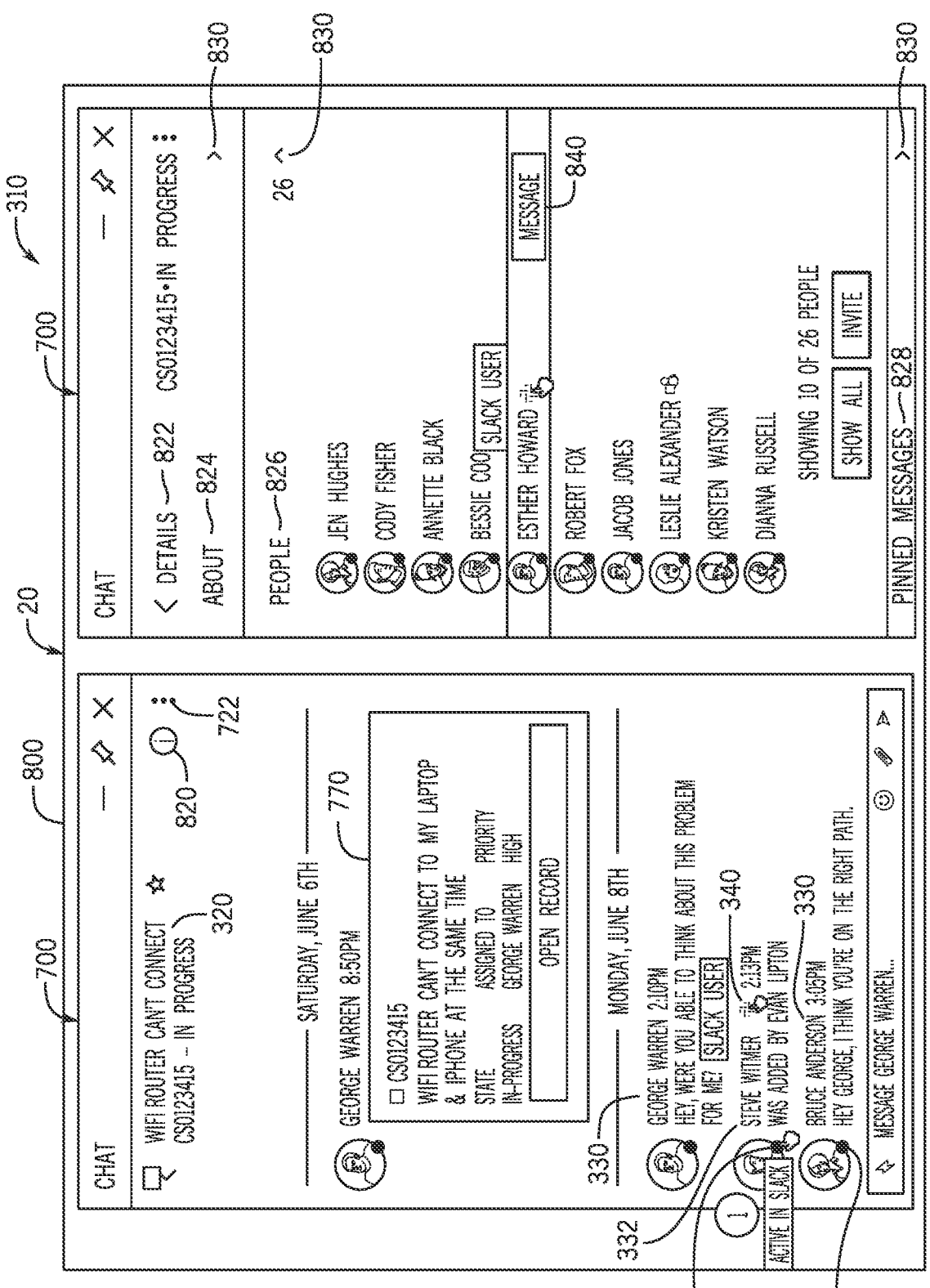
FIG. 13 is a screenshot of an embodiment of a user interface of the collaborative chat system in which the collaborative chat is illustrated as a pop-out module that may be overlaid onto the dashboard, and where further information regarding chat participants may be accessed, in accordance with aspects of the present disclosure.

FIG. 13 is a screenshot of an embodiment of a user interface 800 of the collaborative chat system in which the collaborative chat 700 is illustrated as a pop-out module that may be overlaid onto the dashboard 652 discussed above, in accordance with aspects of the present disclosure. In the illustrated embodiment of the collaborative chat 700 on the left portion of the user interface 800, additional information regarding user activity and chat platforms are displayed for agent view. Indeed, as discussed above, chat messages from the users 330, 332, 336 may be accompanied with their associated status indicators 414, 416, 418, 520 and/or the third-party chat platform icons 340, 342. Moreover, upon selection of an information button 820, the collaborative chat 700 on the right portion of the user interface 800 may be displayed. This example embodiment of the collaborative chat 700 illustrates expandable details 822 regarding the collaborative chat 700, including about details 824, people details 826, pinned message details 828, and so forth. For example, the expandable details 822 may also include a files detail selection that collects any files (e.g., knowledge articles, records, documents) shared within the collaborative chat 700.

Moreover, based on selection or deselection of an expansion button 830, each portion of the example details 822 may be presented on the client device 20 with more or less granularity. Indeed, with the people details 824 presently expanded, members of the collaborative chat 700, along with their status and chat platform indications, may be displayed. Further, by hovering over a particular chat participant, a message 840 button may be selected to initiate a direct, one-to-one chat with a particular participant of the collaborative chat 700, regardless of which chat platform through which the participant is in communication.

Figure 14:
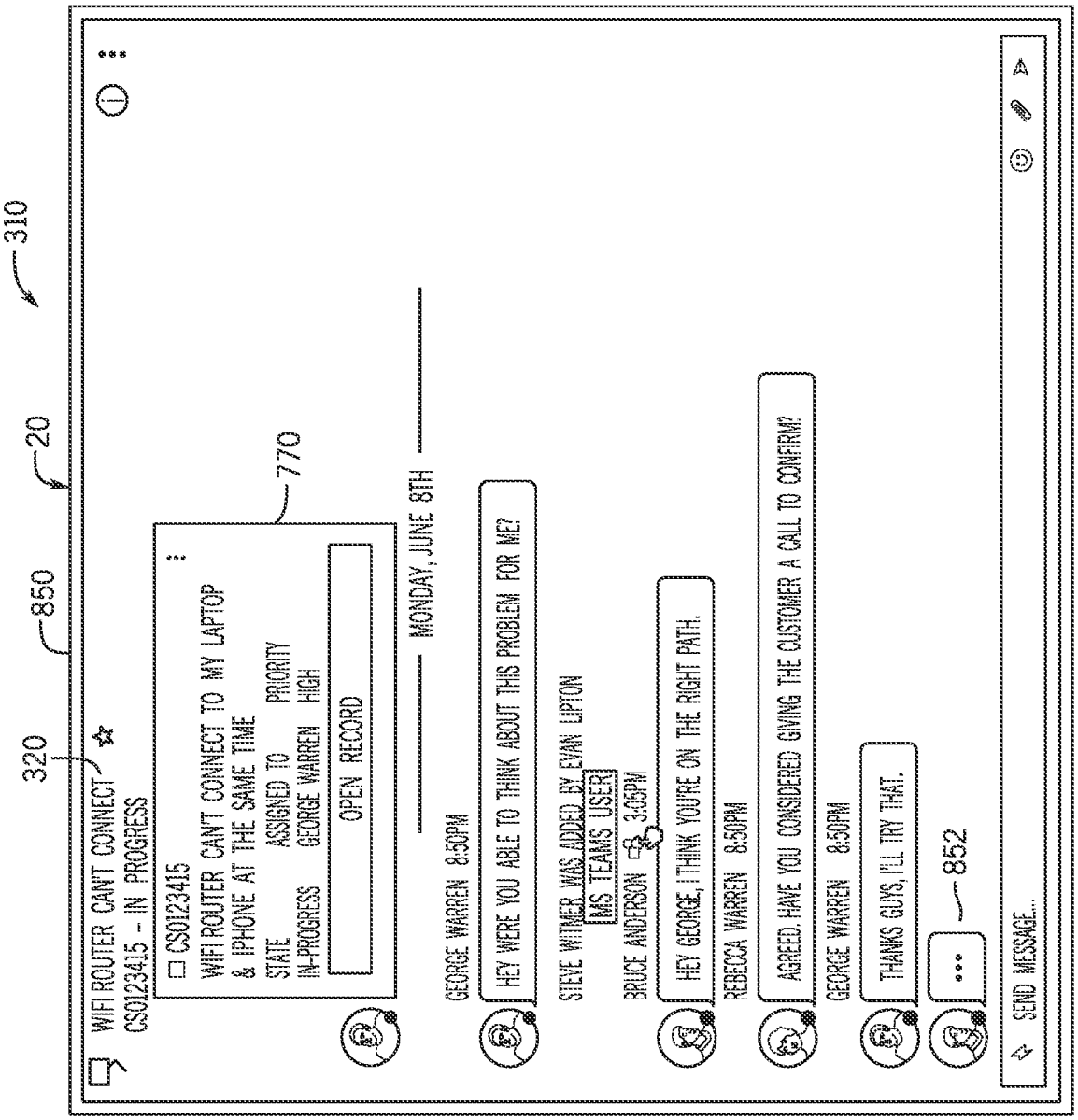
FIG. 14 is a screenshot of an embodiment of a user interface of the collaborative chat system showing the collaborative chat in operation, in accordance with aspects of the present disclosure.

FIG. 14 is a screenshot of an embodiment of a user interface 850 of the collaborative chat system 310 showing the collaborative chat 700 in operation, in accordance with aspects of the present disclosure. As presented, the collaborative chat 700 also presents message-in-progress indications 852 that enable other users to identify when a particular user is presently drafting a response or message. Accordingly, the native chat platform may be communicatively integrated with one or multiple non-native (i.e., third-party) chat platforms to continuously share and receive data regarding users' activity status and indications of whether users of third-party chat platforms are currently typing.

Figure 15:
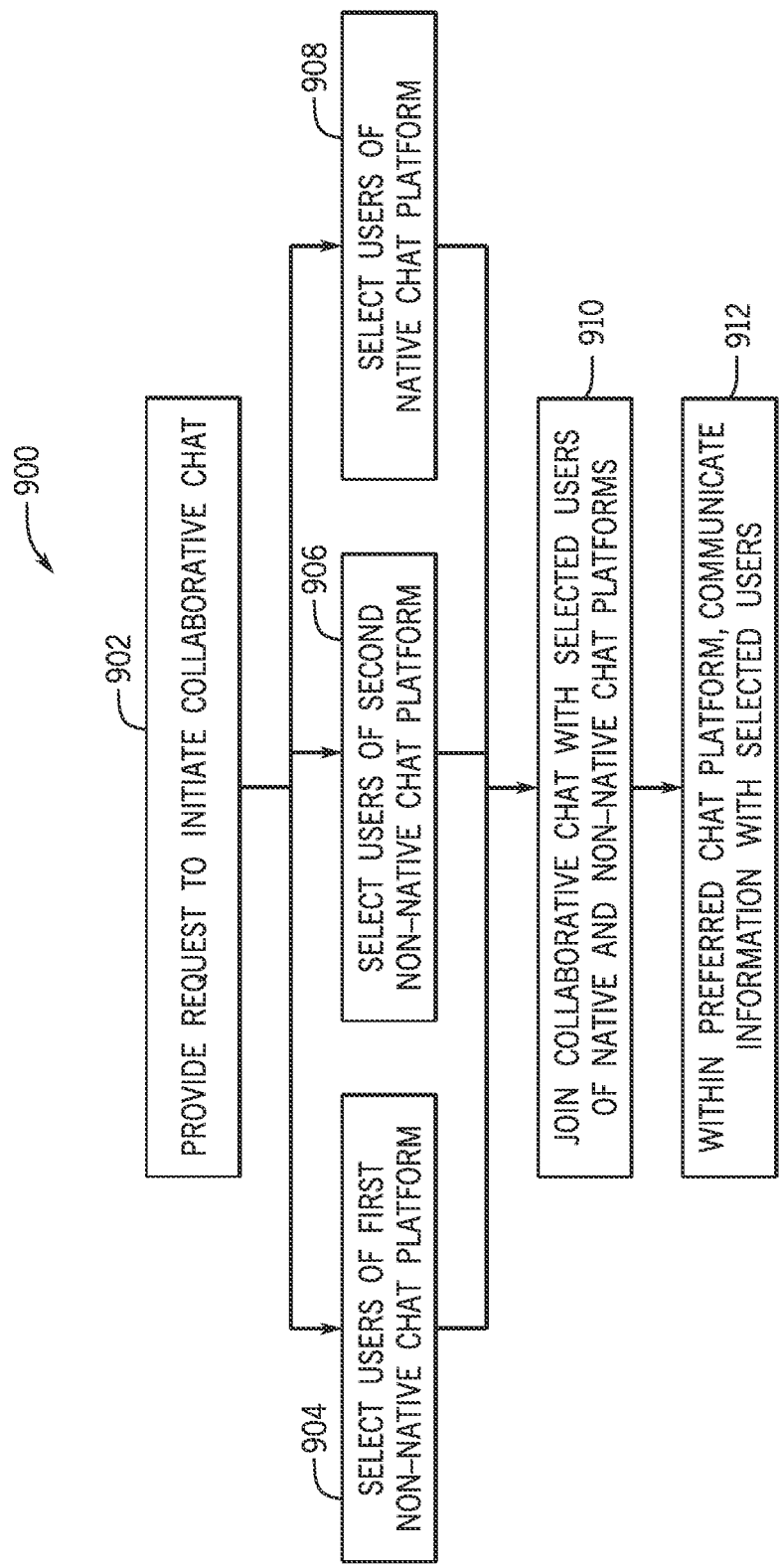
FIG. 15 is a flow diagram of an embodiment of a process for an agent to initiate a collaborative chat between users of a native chat platform and one or more third-party chat platforms via the collaborative chat system, in accordance with aspects of the present disclosure.

FIG. 15 is a flow diagram of an embodiment of a process 900 for an agent, or any suitable user, to initiate a collaborative chat between users of a native chat platform and one or more non-native (i.e., third-party) chat platforms via the collaborative chat system 310, in accordance with aspects of the present disclosure. The steps illustrated in the process 900 are meant to facilitate discussion and are not intended to limit the scope of this disclosure, because additional steps may be performed, certain steps may be omitted, and the illustrated steps may be performed in an alternative order or in parallel, where appropriate. The process 900 may be implemented by a client device 20 interacting with the collaborative chat system 310. However, in other embodiments, the collaborative chat system 310 may facilitate performance of the process 900 via any suitable device, client instance, network, cloud-based platform, or a combination thereof.

To start the process 900, the client device 20 of the user (e.g., agent, native user, third-party user) provides (block 902) a request to initiate a collaborative chat 700 to the collaborative chat system 310. As discussed above, via the native chat platform accessible through the client device 20, the user may select (block 904) users of the first non-native chat platform 334, select (block 906) users of the second non-native chat platform 338, and/or select (block 908) other users of the native chat platform. Indeed, these selections may be performed in parallel and/or in series via any suitable user interface, such as one or more of the user interfaces discussed above. Moreover, it should be understood that certain types of users may be omitted, such that any one of blocks 904, 906, and/or 908 are not performed. Further, although discussed with reference to the non-native (i.e., third-party) chat platforms 334, 338, it should be understood that any suitable number or types of non-native chat platforms that are communicatively coupled to the native chat platform may be selected for within the collaborative chat system 310, according to the present techniques.

Further, the computing device 20 (or communicatively connected computing device 20) may join (block 910) the collaborative chat 700 with the selected users of the native and/or third-party chat platforms. As mentioned above, certain embodiments of the collaborative chat system 310 may provide chat invitations to the selected users. Moreover, other embodiments may automatically join the selected users with the initiating user within the collaborative chat 700. Therefore, within each user's preferred chat platform, the computing device(s) 20 enables the users to communicate (block 912) communally about a selected topic.

Figure 16:
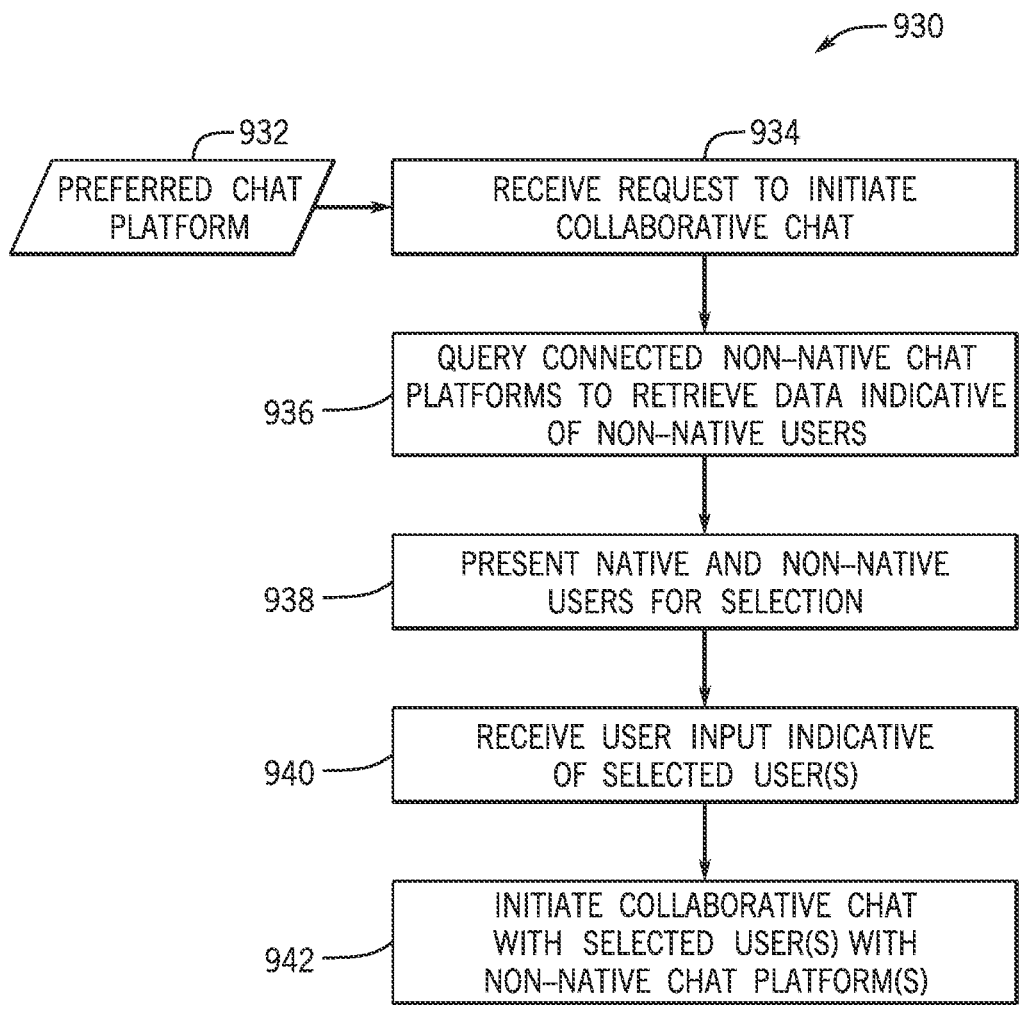
FIG. 16 is a flow diagram of an embodiment of a process for the collaborative chat system to initiate the collaborative chat based on user preferences and communication between connected third-party chat platforms, in accordance with aspects of the present disclosure.

FIG. 16 is a flow diagram of an embodiment of a process 930 for the collaborative chat system 310 to initiate the collaborative chat 700 based on user preferences and communication between different connected chat platforms, in accordance with aspects of the present disclosure. The steps illustrated in the process 930 are meant to facilitate discussion and are not intended to limit the scope of this disclosure, because additional steps may be performed, certain steps may be omitted, and the illustrated steps may be performed in an alternative order or in parallel, where appropriate. The process 930 may be implemented by the collaborative chat system 310 via any suitable processors, device, client instance, network, cloud-based platform, or a combination thereof.

As mentioned above, each user may have a preferred chat platform 932, such as based on their access to particular software programs and/or based on preferred features of the preferred chat platform 932. Moreover, the collaborative chat system 310 may receive and store an indication of each user's preferred chat platform 932 (e.g., within a user profile database), thereby enabling the collaborative chat system 310 to refer to the indications for identifying through which chat platform each user is accessible. In some embodiments, the collaborative chat system 310 determines the preferred chat platforms 932 of the users based on particular user settings within a respective user profile associated with each user. In an embodiment, the collaborative chat system 310 may automatically determine each user's preferred chat platform 932, such as by analyzing which chat platform is more utilized by a particular user, set to automatically execute upon the particular user initially accessing their client device 20, and so forth.

With the preferred chat platforms 932 identified, the collaborative chat system 310 may receive (block 934) a request to initiate a collaborative chat 700. For example, the request may be received in response to a user (e.g., agent) providing input to the dashboard 652 that a collaborative chat 700 regarding a particular topic 320 or service ticket is desired. However, as mentioned above, users of the non-native chat platforms 334, 338 may also interface with the collaborative chat system 310 in certain embodiments, thereby enabling the non-native chat platforms 334, 338 to provide indications to the collaborative chat system 310 that the collaborative chat is requested by users implementing their preferred chat platform 932.

Additionally, the collaborative chat system 310 queries (block 936) any connected non-native chat platforms 334, 338 to retrieve data indicative of users of the non-native chat platforms 334, 338. For example, in certain embodiments, the collaborative chat system 310 may include an input application programming interface (API) and/or an output API for each non-native chat platform 334, 338 to condition communications between the native chat platform and each non-native chat platform 334, 338. As such, the collaborative chat system disclosed herein provides complete, bi-directional communication between users regardless of the chat platform each user is implementing. That is, in contrast to systems that may merely forward messages from one platform to another in a one-directional manner, the present techniques leverage fully integrated data exchange between the native and non-native chat platforms, such that all messages or input may be maintained within the single chat window 762 of the collaborative chat 700. The data indicative of the users of the non-native chat platforms 334, 338 may include any suitable data related to a chat availability or chat platform of the users. For example, the collaborative chat system 310 may retrieve a current activity status of the users, contact information for the users, and so forth.

Continuing the process 930, the collaborative chat system 310 presents (block 938) any native and/or non-native users on the client device 20 for the chat initiator to select. For example, the collaborative chat system may display the user listing 410, the checkable user listing 512, or any other suitable presentation of accessible users. Indeed, as discussed in detail above with reference to FIGS. 5-9, the collaborative chat system 310 of certain embodiments presents indications of users in conjunction with their respective status indicators 414, 416, 418, 520. Further, for users accessible through the non-native platforms 334, 338, the collaborative chat system 310 presents the icons 340, 342 indicating the particular chat platforms through which the users are available to communicate. In certain embodiments, the collaborative chat system 310 may also present a corresponding icon indicating that other users of the native chat platform are accessible through the native chat platform.

Based on the presented users, the collaborative chat system 310 may receive (block 940) user input indicative of one or more selected users to be added or invited to the collaborative chat 700. Accordingly, the collaborative chat system 310 initiates (block 942) the collaborative chat 700 with the selected users, who may be based on any suitable native or non-native chat platforms. Moreover, as discussed above, participants may be added in multiple phases, such that additional participants may be added to the collaborative chat 700 after its generation. Moreover, it should be understood that, in certain embodiments and based on particular user settings/authorizations, multiple participants may be authorized to add additional participants to the collaborative chat 700. In such embodiments, a chat entry may indicate that a particular new participant has been added by a particular existing participant. As such, the presently disclosed collaborative chat system 310 also enables collaborative chat formation to selectively communicatively couple various users within the collaborative chat 700, despite certain users implementing non-native chat platforms.

Figure 17:
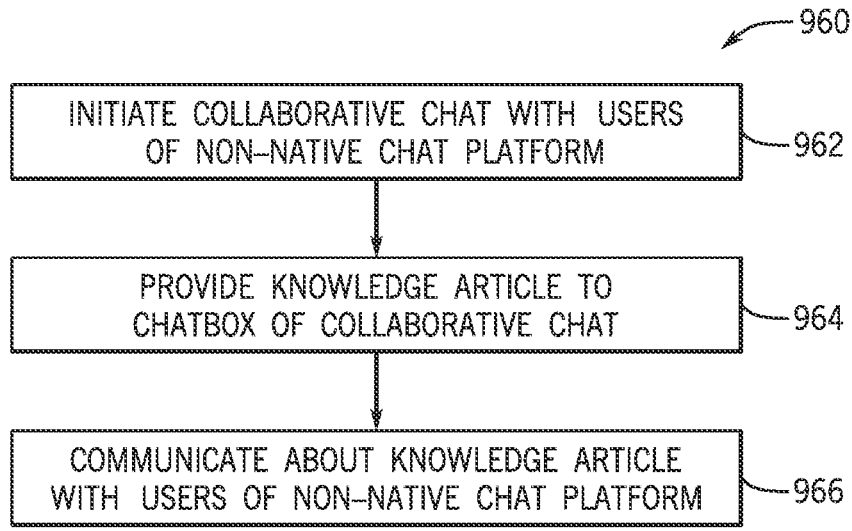
FIG. 17 is a flow diagram of an embodiment of a process for sharing knowledge articles via the collaborative chat system, in accordance with aspects of the present disclosure.

FIG. 17 is a flow diagram of an embodiment of a process 960 for sharing knowledge articles via the collaborative chat system 310, in accordance with aspects of the present disclosure. The steps illustrated in the process 960 are meant to facilitate discussion and are not intended to limit the scope of this disclosure, because additional steps may be performed, certain steps may be omitted, and the illustrated steps may be performed in an alternative order or in parallel, where appropriate. The process 960 may be implemented by the collaborative chat system 310 via any suitable processors, device, client instance, network, cloud-based platform, or a combination thereof.

To begin the process 960, the collaborative chat system 310 initiates (block 962) a collaborative chat 700 with users of at least one non-native chat platform, such as via the process 930 discussed above with reference to FIG. 16. It should be understood that users of any number of non-native chat platforms, as well as users of the native chat platform may be communicatively coupled through the collaborative chat 700. Indeed, the collaborative chat system 310 unites the various users 330, 332, 336 of native and non-native chat platforms within a common chat box or single window that is readily accessible to a user addressing a particular topic.

Moreover, in response to a user providing input indicative of a knowledge article, the collaborative chat system 310 may provide (block 964) the knowledge article to a chatbox of the collaborative chat 700. Indeed, through the bi-directional communicative coupling between the native and non-native chat platforms accorded by the collaborative chat system 310, users may seamlessly transmit knowledge articles to one another. In certain embodiments, the collaborative chat system 310 may retain or store a record of knowledge articles transmitted to the collaborative chat 700, thereby generating an accessible collection of knowledge articles associated with the discussed topic.

Figure 18:
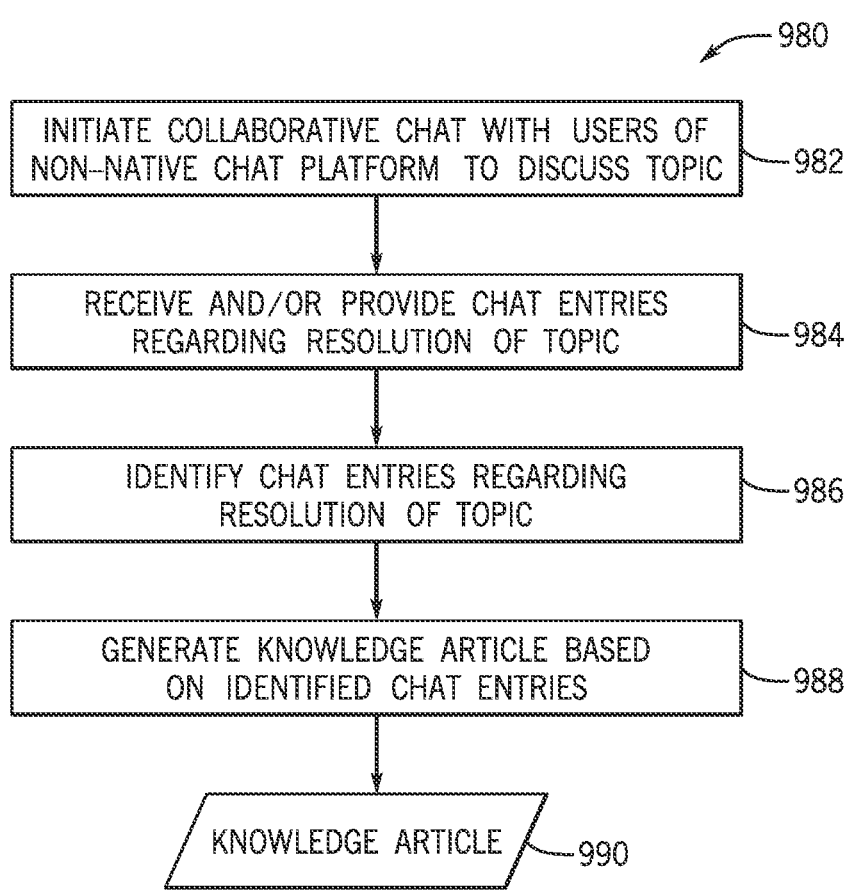
FIG. 18 is a flow diagram of an embodiment of a process for automatically generating knowledge articles based on identified chat entries within the collaborative chat via the collaborative chat system, in accordance with aspects of the present disclosure.

Moreover, in response to receiving user input indicative of chat messages, the collaborative chat system 310 enables users to communicate (block 966) with other users of non-native chat platforms about the knowledge article. Indeed, through the collaborative chat 700, chat participants may discuss and provide any suitable information, such as summaries, proposed strategies, reference documents, and so forth FIG. 18 is a flow diagram of an embodiment of a process 980 for automatically generating knowledge articles based on identified chat entries within the collaborative chat via the collaborative chat system 310, in accordance with aspects of the present disclosure. The steps illustrated in the process 980 are meant to facilitate discussion and are not intended to limit the scope of this disclosure, because additional steps may be performed, certain steps may be omitted, and the illustrated steps may be performed in an alternative order or in parallel, where appropriate. The process 980 may be implemented by the collaborative chat system 310 via any suitable processors, device, client instance, network, cloud-based platform, or a combination thereof.

In the illustrated embodiment, the collaborative chat system initiates (block 982) a collaborative chat 700 with users of a non-native chat platform 334, 338 to enable the users to discuss a topic with users of a native chat platform, as discussed above. Moreover, the collaborative chat system 310 may receive and/or provide (block 984) chat entries regarding a resolution of the topic between chat participants. Indeed, by uniting various users of various backgrounds and expertise, a solution or proposed path forward may be readily reached to help resolve an issue or concern raised by a customer.

Moreover, the collaborative chat system 310 may receive an indication that identifies (block 986) one or more chat entries (or portions thereof) regarding the resolution of topic. As a first example, a particular user may manually select certain chat entries or data therefrom and add this information to a knowledge article template of the collaborative chat system 310. Additionally or alternatively, the collaborative chat system 310 may receive input indicating that at least one message within the collaborative chat 700 has been pinned, starred, or otherwise denoted as important.

Therefore, the collaborative chat system 310 may generate (block 988) a knowledge article 990 based on the identified chat entries. Users may trigger or initiate a new knowledge article request and/or make updates to a knowledge article via or from the collaborative chat system 310. Further, in embodiments in which at least one message has been pinned or starred, the collaborative chat system 310 may automatically generate or facilitate the automatic generation of the knowledge article based on the pinned or starred messages. For example, the pinned message(s) may be utilized as an indicator for a knowledge manager to generate a knowledge article. Accordingly, a knowledge article 990 is generated by the collaborative chat system 310 to streamline future resolution of similar customer incidents or events.

Figure 19:
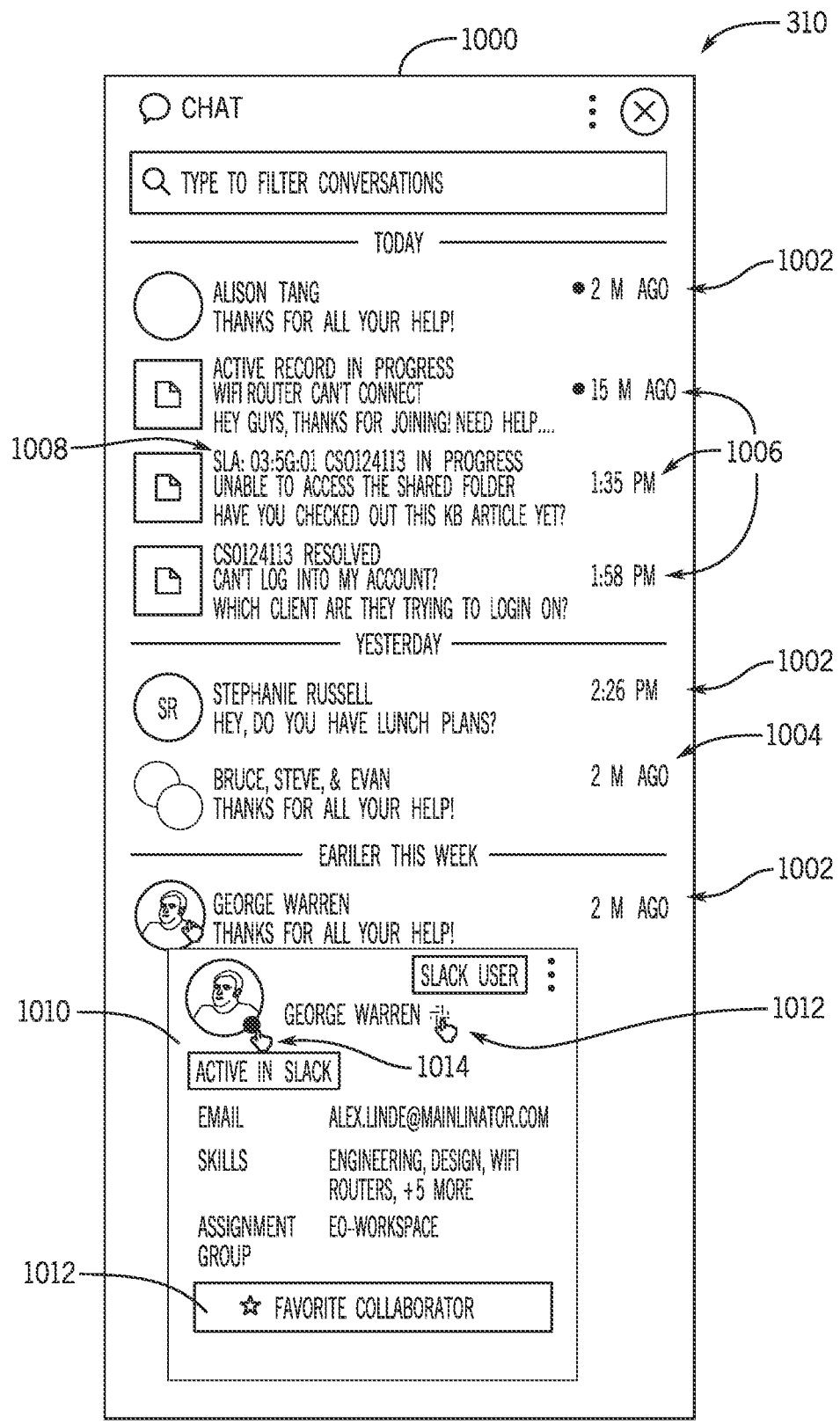
FIG. 19 is a screenshot of an embodiment of a chat list user interface of the collaborative chat system that presents information regarding different chats (e.g., record-based chats, group chats, 1-on-1 chats) of the user, in accordance with aspects of the present disclosure.

FIG. 19 is a screenshot of an embodiment of a chat list user interface 1000 of the collaborative chat system 310 that presents information regarding various chats (e.g., record-based chats, group chats, 1-on-1 chats) of the user, in accordance with aspects of the present disclosure. For the illustrated embodiment, the various chats of the agent are sorted and grouped within the user interface 1000 based on conversational activity (e.g., the last message exchanged). The example chats include one-on-one chats 1002, group chats 1004, and record-based chats 1006. It may be appreciated that certain records (e.g., incidents, problems, tickets) may be associated with service level agreements (SLA) that define a pre-agreed time window in which the agent and/or the service provider should address or resolve the issue associated with the record. When the collaborative chat system 310 has created a record-based chat to discuss the resolution of a record that is associated with such a SLA, then the user interface 1000 may present the conversation with an indication 1008 of the SLA, as well as an amount of time remaining in the time window.

Additionally, for the embodiment of the user interface 1000 illustrated in FIG. 19, when the agent hovers the cursor of a pointing device over an indicator associated with a particular user, a contact card 1010 associated with the user is presented. The contact card 1010 presents relevant information regarding the user's chat profile, including contact information, confirmed skills, and assignment group. As noted for embodiments discussed above, the contact card 1010 includes a platform indicator 1012 that represents the user's preferred chat platform, as well as a status indicator 1014 that indicates the user's recent presence or activity status on the preferred chat platform. The contact card 1010 also includes a favorite collaborator button 1012, which enables the agent to request that the collaborative chat system 310 add the user to a list of favorite collaborators of the agent that is stored and maintained by the collaborative chat system 310. Once the user has been added to this favorite collaborator list, when the agent is adding users to future chats, as discussed above with respect to FIG. 6, then the collaborative chat system 310 may preferentially suggest or sort available favorite collaborators above other suggested users. It may be noted that the collaborative chat system 310 may present the contact card 1010 of a user in other portions of the user interfaces of the system, such as in response to the agent hovering the cursor of a pointing device over the author of a particular message within a particular chat window.

Figure 20:
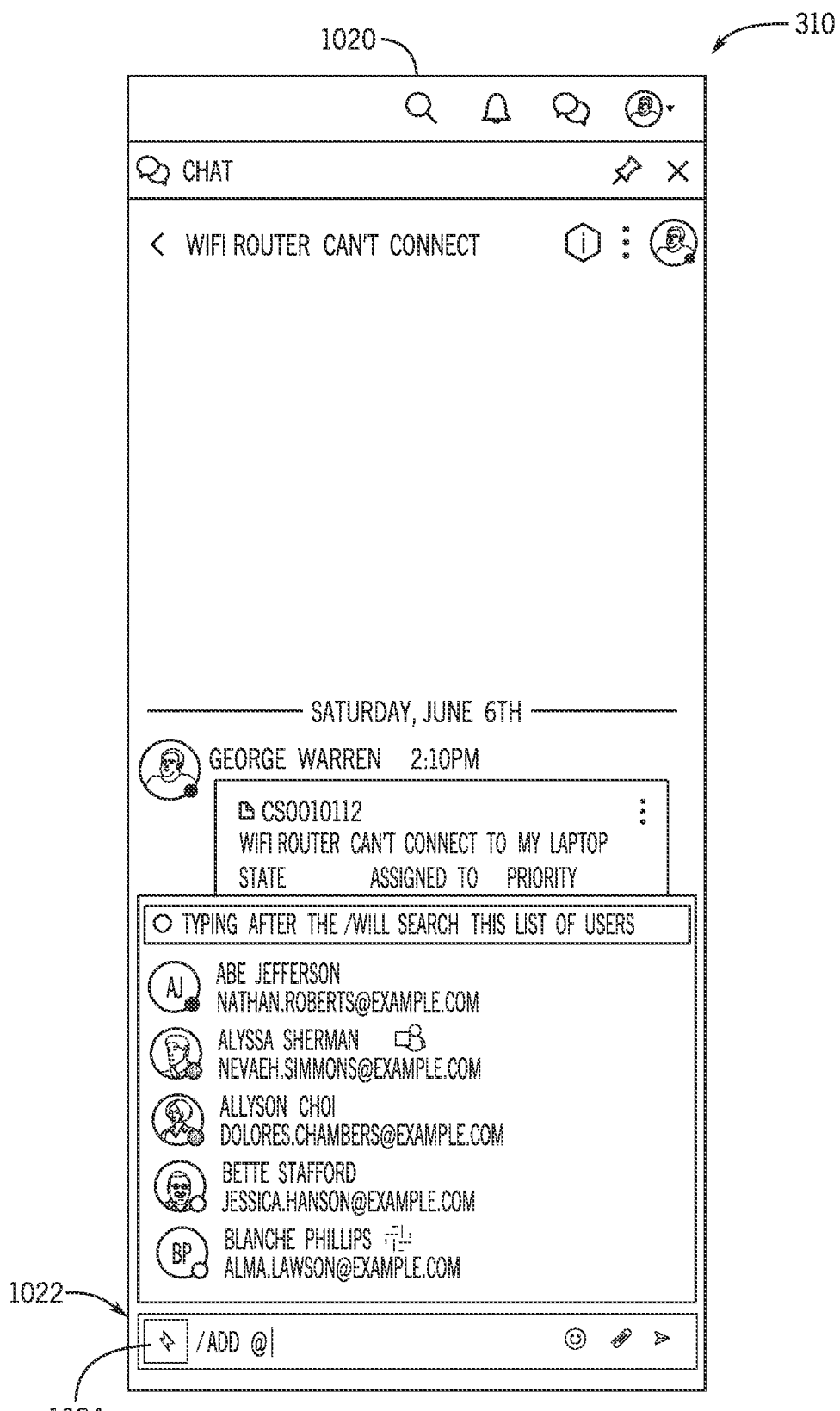
FIG. 20 is a screenshot of an embodiment of a chat user interface of the collaborative chat system for an example record-based chat, in accordance with aspects of the present disclosure.

FIG. 20 is a screenshot of an embodiment of a chat user interface 1020 of the collaborative chat system 310 for an example record-based chat regarding an incident (e.g., a case, a ticket, a problem) in which a Wi-Fi router is unable to connect. While the chatbox 1022 of the user interface 1020 can be used to send messages to the participants of the record-based chat, as discussed above, for the illustrated embodiment, the chatbox 1022 also accepts quick action commands. These quick action commands can be entered via a keyboard without requiring use of a pointing device, which may be more convenient and efficient for the agent. For the illustrated example, quick action commands are provided with an escape character (e.g., a leading slash), and may include actions such as adding new users to the chat, removing users from the chat, opening or updating the record associated with the chat, requesting a knowledge base article be generated for the topic of the chat, sending a knowledge base article to the participants of the chat, mentioning a non-participant user within the chat, and so forth. More specifically, in the illustrated example, after the agent types "/add @" in the chatbox 1022, the user interface is updated to present a list of users that can be added to the chat via the quick action. For the illustrated embodiment, the user interface 1020 also includes a quick action button 1024 that enables these quick commands to be selected by the agent using a pointing device instead, which provides the agent with flexibility depending on their input device preferences.

Figure 21A:
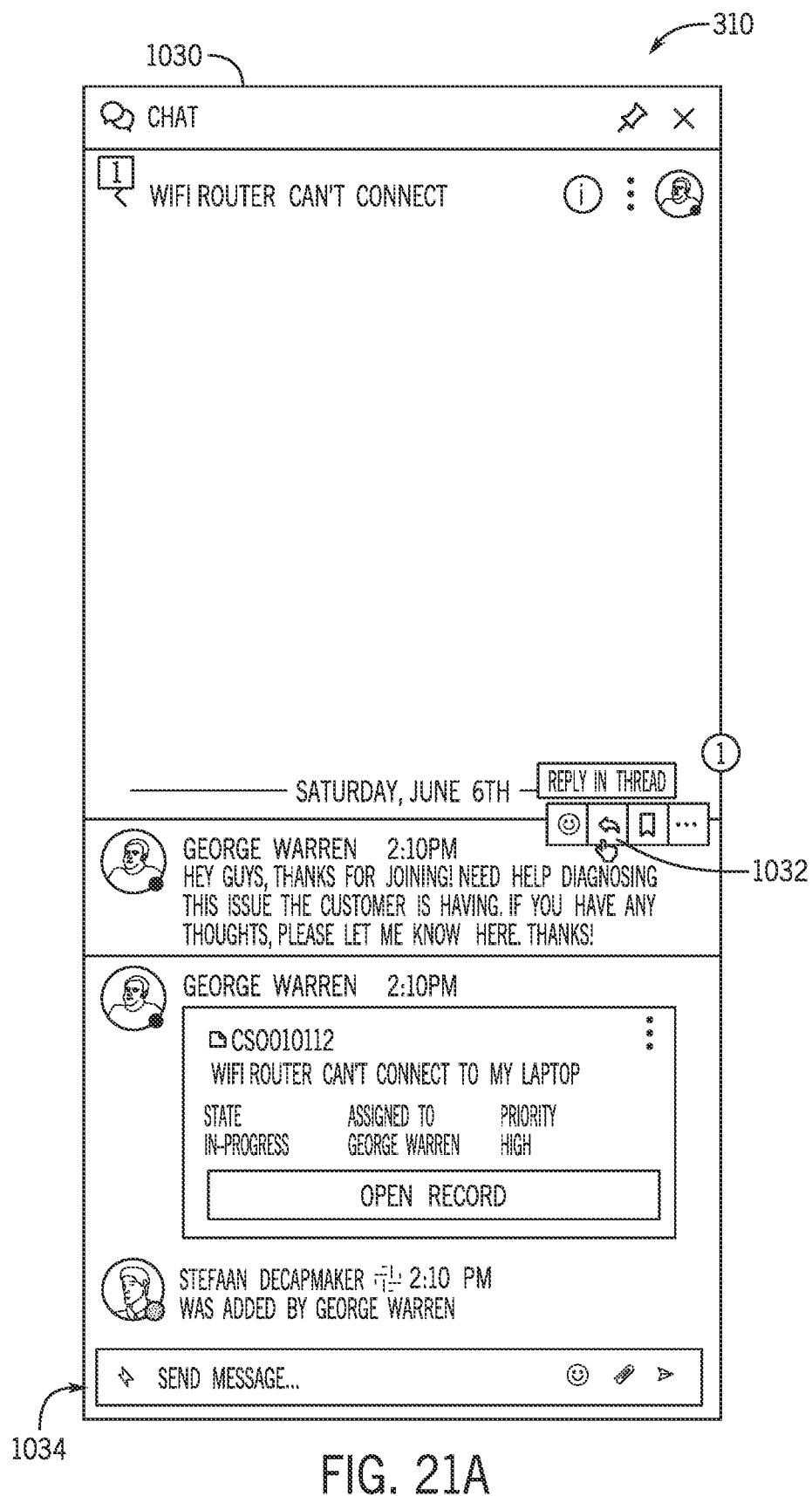
FIGS. 21A, 21B, and 21C are screenshots of an embodiment of a chat user interface 1030 of the collaborative chat system 310 for another example record-based chat highlighting message threading within the collaborative chat system 310, in accordance with aspects of the present disclosure.
Figure 21B:
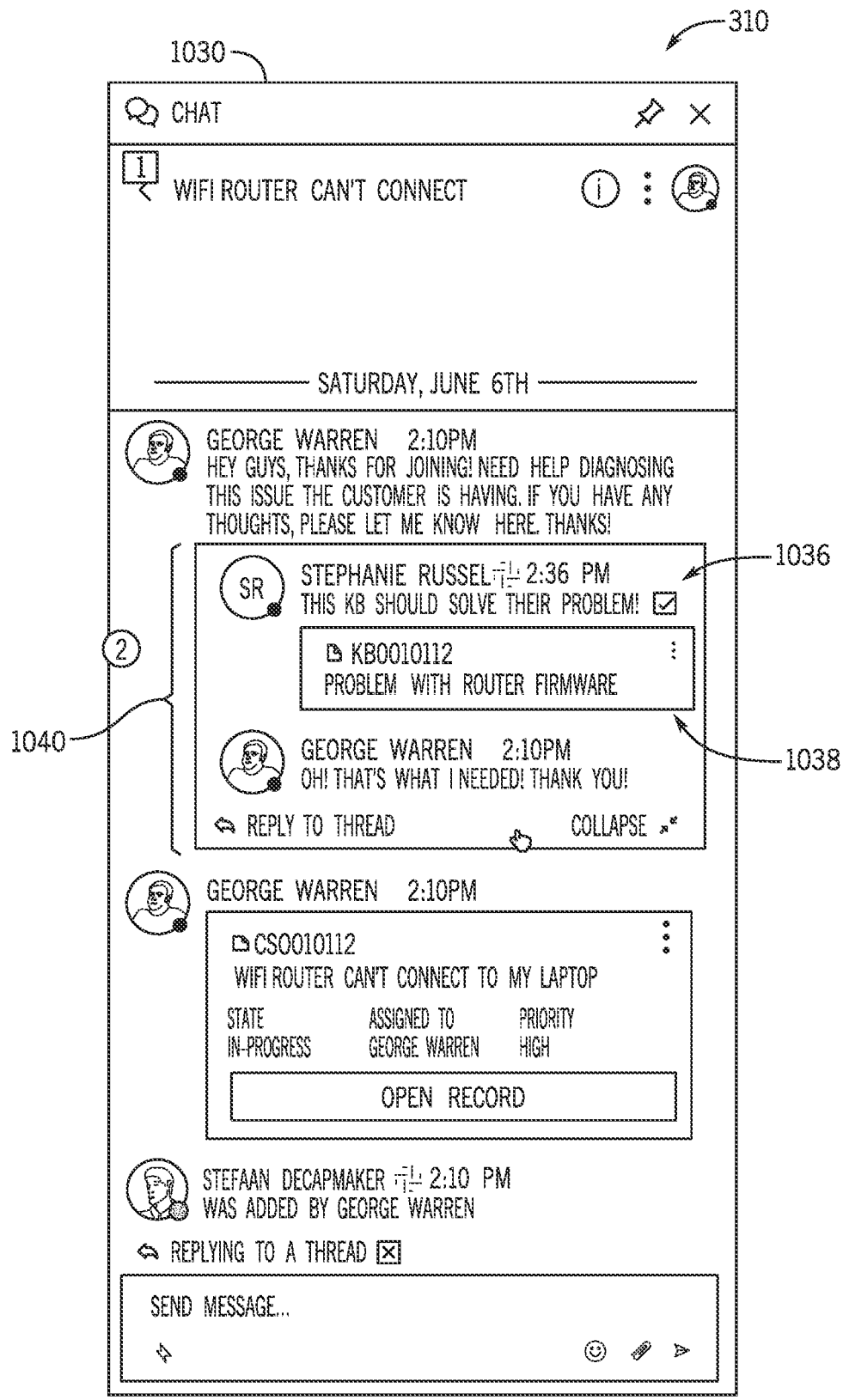
Figure 21C:
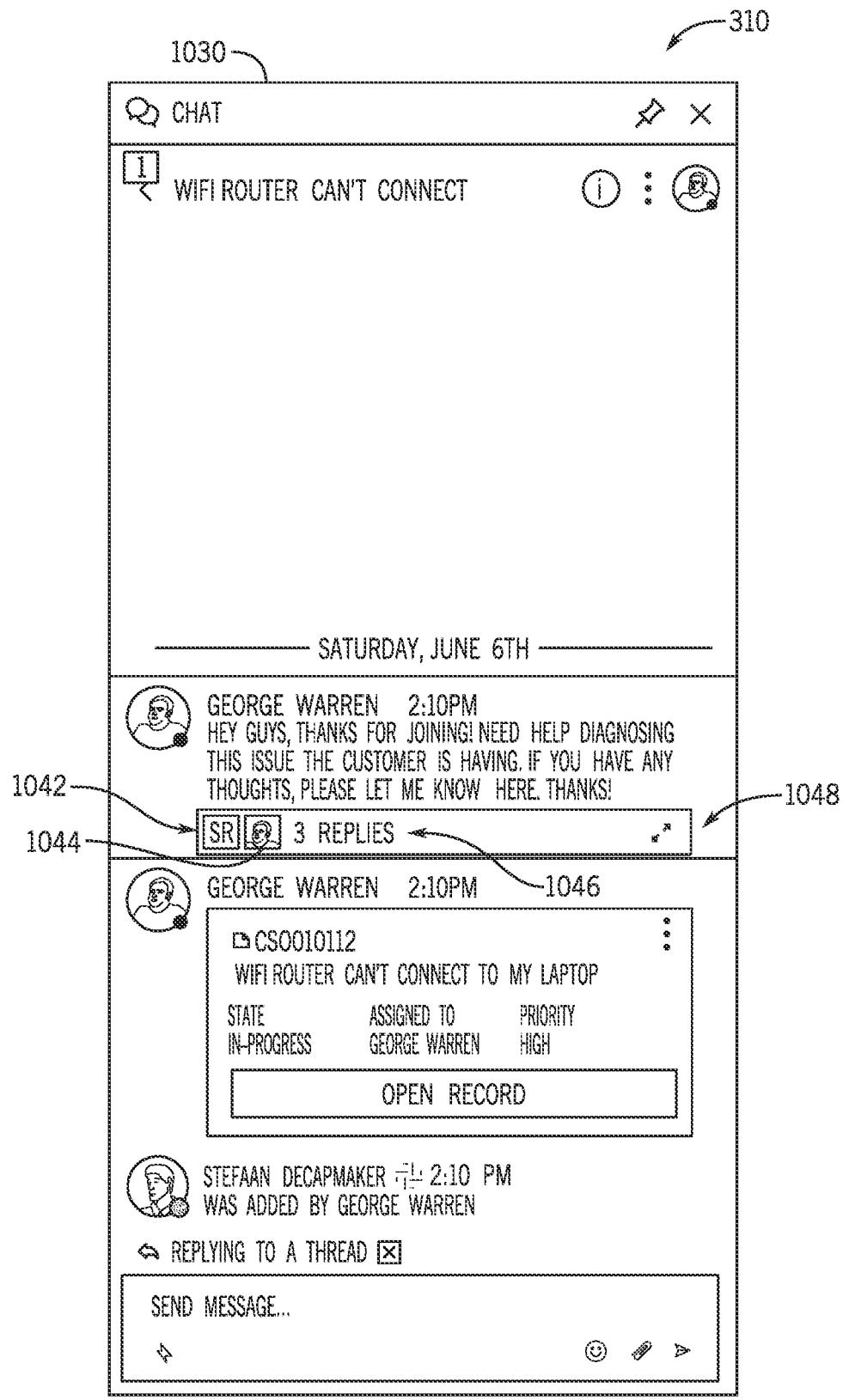

FIGS. 21A, 21B, and 21C are screenshots of an embodiment of a chat user interface 1030 of the collaborative chat system 310 for another example record-based chat highlighting message threading within the collaborative chat system 310, in accordance with aspects of the present disclosure. Since certain chats may have a number of participants that may be attempting to respond to different messaged within the conversation at various times, it could become difficult for the agent to determine the flow of the conversation. Accordingly, the collaborative chat system 310 supports message threading. For example, using the user interface 1030 illustrated in FIG. 21A, the agent selects the "reply in thread" button 1032 with respect to a particular message before typing and sending a message along with a knowledge base article attachment using the chatbox 1034. As illustrated in FIG. 21B, the user interface 1030 is subsequently updated to present the message 1036 and knowledge base article 1038 provided by the agent, which is indented below the replied to message as part of a new thread 1040 of the conversation, to which other users can subsequently reply. As illustrated in FIG. 21C, the user interface 1030 can subsequently collapse the thread and instead present a thread block 1042, which includes indicators 1044 for the participants of the thread, a number of messages within the thread 1046, and an expansion button 1048 that re-expands the thread for the agent to view and access within the user interface 1030.

As discussed herein, collaborative chat functionality for an enterprise utilizing multiple chat platforms may be facilitated by multiple techniques and features. A collaborative chat system is provided that enables collaborative communication between a user implementing a native chat platform and at least one other different user who implements a non-native or third-party chat platform. The user may particularly select various other users to be added to a collaborative chat, regardless of which chat platform the other users have set as their main or preferred communication channel. Indeed, when displaying the various users available to be added to the collaborative chat, the collaborative chat system may display a visual indication or icon that indicates which chat platform the various users are available through, as well as status indicators representing whether each user is online, busy, away, offline, etc. The collaborative chat system may utilize bi-directional communications between the native chat platform and any communicatively coupled third-party chat platforms to link the user with the selected other users within the collaborative chat to facilitate efficient topic resolution across multiple chat platforms.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud-based computing system, comprising:
at least one memory configured to store a database and a collaborative chat system; and
at least one processor configured to execute stored instructions to cause the system to perform operations comprising:
generating and providing a graphical user interface (GUI) to a first device, wherein the GUI comprises a dashboard configured to present information related to a record of the database;
receiving, via the GUI, a request to initiate a record-based collaborative chat to discuss the record;
determining a respective preferred chat platform of each of a plurality of users of the collaborative chat system based on respective chat platform usage of each user of the plurality of users, wherein the respective preferred chat platform of one or more users of the plurality of users is a third-party chat platform;
presenting, via the GUI, a selectable list of the plurality of users that includes a respective icon indicating the respective preferred chat platform of each user of the plurality of users;
receiving, via the GUI, a selection from the first device of a set of users from the selectable list;
initiating, in response to receiving the selection, the record-based collaborative chat between the first device and one or more additional devices associated with each user of the set of users via their respective preferred chat platform;
posting, to the record-based collaborative chat, an interactive record item configured to present at least a portion of the information related to the record and to provide each user of the set of users with access to the record;
presenting, via the GUI, the record-based collaborative chat on the first device and updating the dashboard of the GUI to present a representation of the record-based collaborative chat that summarizes details of the record-based collaborative chat;
transmitting a chat message of the record-based collaborative chat between the first device and the one or more additional devices;
receiving, via the GUI, input requesting that the chat message be assigned a pinned status;
updating the GUI such that the chat message is pinned to a priority location within a collaborative chat window;
receiving, via the GUI, user input requesting that a knowledge article be generated based on the chat message; and
automatically generating the knowledge article, wherein the knowledge article associates a topic of the record-based collaborative chat with the chat message.

2. The cloud-based computing system of claim 1, wherein the selectable list of the plurality of users includes at least one user whose respective preferred chat platform is a native chat platform of the collaborative chat system, and wherein the selection of the set of users from the selectable list includes the at least one user.

3. The cloud-based computing system of claim 1, wherein the selectable list of the plurality of users includes a respective status indicator representing a respective user status of each user of the plurality of users on their respective preferred chat platform.

4. The cloud-based computing system of claim 3, wherein the selectable list of the plurality of users is sorted based on the respective user status of each user of the plurality of users on their respective preferred chat platform, based on a respective favorite collaborator status of each user of the plurality of users, or a combination thereof.

5. The cloud-based computing system of claim 1, wherein the at least one processor is configured to execute the stored instructions to cause the system to perform operations comprising:
receiving, via the GUI, the chat message of the record-based collaborative chat from the first device;
transmitting the chat message to the one or more additional devices; and
presenting, via the GUI, the chat message as part of the record-based collaborative chat on the first device.

6. The cloud-based computing system of claim 1, wherein the at least one processor is configured to execute the stored instructions to cause the system to perform operations comprising:
receiving, from a particular device of the one or more additional devices, a second chat message of the record-based collaborative chat from a particular user whose respective preferred chat platform is a particular third-party chat platform; and
presenting, via the GUI, the second chat message as part of the record-based collaborative chat on the first device, wherein the second chat message is presented with a user icon representing a user identity of the particular user and a platform icon representing the particular third-party chat platform.

7. The cloud-based computing system of claim 1, wherein the at least one processor is configured to execute the stored instructions to cause the system to perform operations comprising:
transmitting, via the record-based collaborative chat, the knowledge article between the first device and the one or more additional devices.

8. The cloud-based computing system of claim 1, wherein the at least one processor is configured to execute the stored instructions to cause the system to perform operations comprising:
receiving second user input requesting that the respective preferred chat platform of a particular user be updated to a different preferred chat platform; and
updating a user profile of the particular user such that the respective preferred chat platform of the particular user is the different preferred chat platform.

9. A method of operating a collaborative chat system, comprising:

generating and providing a graphical user interface (GUI) to a first device, wherein the GUI comprises a dashboard configured to present information related to a record of a database;

receiving, via the GUI, a request from a first user of the first device to initiate a record-based collaborative chat to discuss the record;

determining a respective preferred chat platform of each user of a plurality of users of the collaborative chat system based on respective chat platform usage of each user of the plurality of users, wherein the respective preferred chat platform of one or more users of the plurality of users is a third-party chat platform;

presenting, via the GUI, a selectable list of the plurality of users that includes a respective icon indicating the respective preferred chat platform of each user of the plurality of users;

receiving, via the GUI, a selection of a set of users from the selectable list;

initiating the record-based collaborative chat between the first device and one or more additional devices associated with each user of the set of users via their respective preferred chat platform;

posting, to the record-based collaborative chat, an interactive record item configured to present at least a portion of the information related to the record and to provide each user of the set of users with access to the record;

presenting, via the GUI, the record-based collaborative chat on the first device and updating the dashboard of the GUI to present a representation of the record-based collaborative chat that summarizes details of the record-based collaborative chat;

transmitting a chat message of the record-based collaborative chat between the first device and the one or more additional devices;

receiving, via the GUI, input requesting that the chat message be assigned a pinned status;

updating the GUI such that the chat message is pinned to a priority location within a collaborative chat window;

receiving, via the GUI, user input requesting that a knowledge article be generated based on the chat message; and automatically generating the knowledge article, wherein the knowledge article associates a topic of the record-based collaborative chat with the chat message.

10. The method of claim 9, wherein the selectable list of the plurality of users includes a second user whose respective preferred chat platform is a first third-party chat platform and a third user whose respective preferred chat platform is a native chat platform of the collaborative chat system, and wherein the selection of the set of users from the selectable list includes the second user and the third user.

11. The method of claim 9, wherein the selectable list includes a respective status indicator representing a current activity status of each user of the plurality of users on their respective chat platforms, and wherein each respective status indicator provides an active status indication, a busy status indication, an idle status indication, or an offline status indication.

12. The method of claim 9, comprising:
transmitting, via the record-based collaborative chat, the knowledge article between the first device and the one or more additional devices.

13. A tangible, non-transitory, machine-readable medium comprising instructions executable by one or more processors of a collaborative chat system, wherein the instructions comprise instructions to:

generate and provide a graphical user interface (GUI) to a first device, wherein the GUI comprises a dashboard configured to present information related to a record of a database;

receive, via the GUI, a request from the first device to initiate a record-based collaborative chat to discuss the record;

determine a respective preferred chat platform of each user of a plurality of users of the collaborative chat system based on respective chat platform usage of each user of the plurality of users, wherein the respective preferred chat platform of one or more users of the plurality of users is a third-party chat platform;

present, via the GUI, a selectable list of the plurality of users that includes a respective icon indicating the respective preferred chat platform of each user of the plurality of users;

receive, via the GUI, a selection of a set of users from the selectable list;

initiate the record-based collaborative chat between the first device and one or more additional devices associated with each user of the set of users via their respective preferred chat platform;

post, to the record-based collaborative chat, an interactive record item configured to present at least a portion of the information related to the record and to provide each user of the set of users with access to the record;

present, via the GUI, the record-based collaborative chat on the first device and update the dashboard of the GUI to present a representation of the record-based collaborative chat that summarizes details of the record-based collaborative chat;

transmit a chat message of the record-based collaborative chat between the first device and the one or more additional devices;

receive, via the GUI, input requesting that the chat message be assigned a pinned status;

update the GUI such that the chat message is pinned to a priority location within a collaborative chat window;

receive, via the GUI, user input requesting that a knowledge article be generated based on the chat message; and automatically generate the knowledge article, wherein the knowledge article associates a topic of the record-based collaborative chat with the chat message.

14. The tangible, non-transitory, machine-readable medium of claim 13, wherein the instructions comprise instructions to:
transmit user-submitted chat messages, the record, the knowledge article, or any combination thereof, between the first device and the one or more additional devices associated with the set of users.

15. The tangible, non-transitory, machine-readable medium of claim 13, wherein the selectable list comprises respective status indicators indicating a respective availability of each user of the plurality of users via their respective preferred chat platform.

16. The cloud-based computing system of claim 1, wherein the details of the record-based collaborative chat summarized by the representation of the record-based collaborative chat comprise:

a title of the record-based collaborative chat;

a respective visual representation for each user of the one or more users of the record-based collaborative chat;

an indication of an amount of time that has lapsed since the initiating of the record-based collaborative chat;

an identity of a user of the first device that initiated the record-based collaborative chat; and a button configured to present, via the GUI, the record-based collaborative chat in response to being selected.

17. The cloud-based computing system of claim 1, wherein the at least one processor is configured to execute the stored instructions to cause the system to perform operations comprising:

storing one or more messages of the record-based collaborative chat in the at least one memory and associating the record with the one or more messages of the record-based collaborative chat in the at least one memory.

* * * * *